US012768019B2

(12) United States Patent
Takasuga et al.

(10) Patent No.: US 12,768,019 B2
(45) Date of Patent: Oct. 20, 2026

(54) STEEL MATERIAL, AND CRANKSHAFT MADE OF THE STEEL MATERIAL

(71) Applicants: NIPPON STEEL CORPORATION, Tokyo (JP); HONDA MOTOR CO., LTD., Tokyo (JP)

(72) Inventors: Motoki Takasuga, Tokyo (JP); Shigefumi Nishitani, Tokyo (JP); Masato Yuya, Tokyo (JP); Hitoshi Matsumoto, Tokyo (JP); Shota Hama, Tokyo (JP); Hiroki Masuda, Wako (JP); Hideki Matsuda, Wako (JP); Hiromasa Takahashi, Wako (JP)

(73) Assignees: NIPPON STEEL CORPORATION, Tokyo (JP); HONDA MOTOR CO., LTD., Tokyo (JP)

( * ) Notice: Subject to any disclaimer, the term of this patent is extended or adjusted under 35 U.S.C. 154(b) by 400 days.

(21) Appl. No.: 18/563,615

(22) PCT Filed: May 26, 2021

(86) PCT No.: PCT/JP2021/020044

§ 371 (c)(1),
(2) Date: Nov. 22, 2023

(87) PCT Pub. No.: WO2022/249349

PCT Pub. Date: Dec. 1, 2022

(65) Prior Publication Data

US 2024/0368744 A1 Nov. 7, 2024

(51) Int. Cl.

*C22C 38/04* (2006.01)
*C22C 38/00* (2006.01)
*C22C 38/02* (2006.01)
*C22C 38/60* (2006.01)
*F16C 3/06* (2006.01)

(52) U.S. Cl.

CPC ............ *C22C 38/04* (2013.01); *C22C 38/001* (2013.01); *C22C 38/02* (2013.01); *C22C 38/60* (2013.01); *F16C 3/06* (2013.01)

(58) Field of Classification Search

None
See application file for complete search history.

(56) References Cited

FOREIGN PATENT DOCUMENTS

EP 1316624 B1 8/2006
EP 3480333 A1 5/2019
(Continued)

*Primary Examiner* — Anthony M Liang
(74) *Attorney, Agent, or Firm* — Greer, Burns & Crain, Ltd.

(57) ABSTRACT

The steel material consists of, in mass %, C: 0.25% to 0.35%, Si: 0.05 to 0.35%, Mn: 0.85 to 1.20%, P: 0.080% or less, S: 0.030 to 0.100%, Cr: 0.10% or less, Ti: 0.050% or less, Al: 0.050% or less, N: 0.005 to 0.024%, and O: 0.0100% or less, with the balance being Fe and impurities, and Fn1 defined in the specification is 1.00 to 2.05, and Fn2 defined in the specification is 0.42 to 0.60. A surface number density of MnS single inclusions and MnS composite inclusions having an equivalent circular diameter of 5.0 μm or more is 20/mm$^2$ or more. A ratio of the total number of MnS single inclusions and MnS composite inclusions with respect to the total number of inclusions is 70% or more. A ratio of the number of MnS composite oxides with respect to the total number of oxides is 30% or more.

4 Claims, 3 Drawing Sheets

(56) References Cited

FOREIGN PATENT DOCUMENTS

| | | | | |
|---|---|---|---|---|
| JP | 2013007077 | A | | 1/2013 |
| JP | 2017186658 | A | * | 10/2017 |
| WO | 2016182013 | A1 | | 11/2016 |

* cited by examiner

STEEL MATERIAL, AND CRANKSHAFT MADE OF THE STEEL MATERIAL

TECHNICAL FIELD

The present invention relates to a steel material and a crankshaft, and more particularly relates to a steel material that serves as a starting material for a crankshaft, and a crankshaft produced by subjecting the steel material to nitriding.

BACKGROUND ART

Crankshafts are utilized in transportation machines as typified by automobiles, trucks, and construction machinery. Crankshafts are required to have excellent bending fatigue strength. In addition, recently, for the purpose of reducing the environmental load, the idling stop technology that repeats starting and stopping of an engine is in widespread use. As starting and stopping of the engine is highly frequently repeated, the crankshaft is also operated highly frequently before an oil film (oil film formed by engine oil) is fully formed on a sliding section such as a pin section or a journal section of the crankshaft. In addition, recently, for the purpose of improving fuel efficiency, the viscosity of engine oil has been lowered. There is thus a tendency for the thickness of an oil film that protects the sliding sections of a crankshaft to decrease. Therefore, crankshafts are required to have not only excellent bending fatigue strength but also excellent wear resistance.

In addition, accompanying the aforementioned demand to improve fuel efficiency, components of transportation machines are being increasingly reduced in weight. As a result, crankshafts with complex and difficult-to-machine shapes that have not been applied in the past have appeared. Therefore, a steel material that is used as the starting material for a crankshaft is required to have excellent machinability.

Nitriding is known as a technique which, among the aforementioned bending fatigue strength, wear resistance, and machinability, increases the bending fatigue strength and the wear resistance of a crankshaft. As used in the present description, the term “nitriding” also includes a nitrocarburizing treatment. Nitriding is a heat treatment technique which causes nitrogen (or nitrogen and carbon) at a temperature that is equal to or less than the $A_1$ transformation point to diffuse and permeate into an outer layer of the steel material. A nitrided layer composed of a compound layer and a diffusion layer is formed in the outer layer of a crankshaft subjected to nitriding. The compound layer is formed at the outermost layer of the crankshaft, and is mainly composed of nitrides typified by $Fe_3N$, and has a depth of about several tens of μm to 30 μm. The diffusion layer is formed further inward than the compound layer, and is a region hardened by nitrogen diffused into the inside of the steel material, and has a depth of about several hundred μm. Nitriding is characterized in that strain generated after heat treatment is small in comparison to other kinds of case hardening heat treatments such as induction hardening treatment and carburizing-quenching treatment.

However, even with nitriding, the strain after heat treatment cannot be completely eliminated. Further, crankshafts in particular are required to have a high degree of straightness. Therefore, usually a crankshaft after nitriding is subjected to a bend-straightening process to increase the straightness of the crankshaft. If a crack occurs in the crankshaft during bend-straightening, the bending fatigue strength will markedly decrease. Accordingly, a steel material to be used for nitriding use is required to have an excellent bend-straightening property, that is, a property that suppresses the occurrence of a crack in a bend-straightening process.

Techniques for increasing the bending fatigue strength and wear resistance of a nitrided component as typified by a crankshaft are disclosed in International Application Publication No. WO2016/182013 (Patent Literature 1) and Japanese Patent Application Publication No. 2013-7077 (Patent Literature 2).

With regard to a nitrided component disclosed in Patent Literature 1, the nitriding potential in the nitriding furnace is controlled so that the compound layer is primarily composed of gamma prime (γ') phase ($Fe_4N$), and the compound layer that is primarily composed of the γ' phase is formed to be a thick layer. It is stated in Patent Literature 1 that by making the compound layer a layer that is primarily composed of the γ' phase, the wear resistance can be increased while maintaining the fatigue strength of the nitrided component.

In the technique disclosed in Patent Literature 2, nitriding is performed after performing preparations by a fluorination treatment. By this means, at the outer layer of the steel material, a wear-resistant layer (first diffusion layer) in which nitrogen is also concentrated in a state in which carbon is concentrated is formed, and a diffusion layer (second diffusion layer) which is primarily composed of carbon with a lower nitrogen concentration is formed further to the inner side of the steel material than the first diffusion layer. It is stated in Patent Literature 2 that by forming a nitrided layer having the aforementioned structure, the steel material is excellent in fatigue strength and wear resistance.

CITATION LIST

Patent Literature

Patent Literature 1: International Application Publication No. WO2016/182013

Patent Literature 2: Japanese Patent Application Publication No. 2013-7077

SUMMARY OF INVENTION

Technical Problem

The fatigue strength and wear resistance of a crankshaft may also be increased by another technique that is different from the techniques disclosed in Patent Literatures 1 and 2. However, in Patent Literatures 1 and 2, the machinability of a steel material to serve as the starting material for a crankshaft, and the bend-straightening property of a crankshaft are not investigated.

An objective of the present disclosure is to provide a steel material to serve as a starting material for a crankshaft which is excellent in machinability and which also has excellent bending fatigue strength, excellent wear resistance, and an excellent bend-straightening property when subjected to nitriding and made into a crankshaft, and to also provide a crankshaft made of the aforementioned steel material as a starting material.

Solution to Problem

A steel material according to the present disclosure consists of, in mass %,

C: 0.25% to 0.35%,
Si: 0.05 to 0.35%,
Mn: 0.85 to 1.20%,
P: 0.080% or less,
S: 0.030 to 0.100%,
Cr: 0.10% or less,
Ti: 0.050% or less,
Al: 0.050% or less,
N: 0.005 to 0.024%, and
O: 0.0100% or less, with
the balance being Fe and impurities,
wherein:
Fn1 defined by Formula (1) is 1.00 to 2.05,
Fn2 defined by Formula (2) is 0.42 to 0.60, and
when, among inclusions in the steel material,
an inclusion in which a total of a content of Mn and a content of S in percent by mass is 80.0% or more is defined as an MnS single inclusion,
an inclusion in which a total of a content of Mn and a content of S in percent by mass is 15.0 to less than 80.0% is defined as an MnS composite inclusion,
an inclusion in which a total of a content of Al, a content of Ca, and a content of O in percent by mass is 80.0% or more, and a total of a content of Mn and a content of S in percent by mass is less than 15.0% is defined as a single oxide, and
an inclusion in which a total of a content of Al, a content of Ca, and a content of O in percent by mass is 15.0 to less than 80.0%, and a total of a content of Mn and a content of S in percent by mass is 15.0 to less than 80.0% is defined as an MnS composite oxide,
in the steel material:
a surface number density of a total of the MnS single inclusions having an equivalent circular diameter of 5.0 μm or more and the MnS composite inclusions having an equivalent circular diameter of 5.0 μm or more is $20/mm^2$ or more,
a ratio of a total number of the MnS single inclusions having an equivalent circular diameter of 1.0 μm or more and the MnS composite inclusions having an equivalent circular diameter of 1.0 μm or more with respect to a total number of inclusions having an equivalent circular diameter of 1.0 μm or more is 70% or more, and
a ratio of a number of the MnS composite oxides having an equivalent circular diameter of 1.0 μm or more with respect to a total number of the single oxides having an equivalent circular diameter of 1.0 μm or more and the MnS composite oxides having an equivalent circular diameter of 1.0 μm or more is 30% or more;

$$Fn1 = \mathrm{Mn} + 7.24\mathrm{Cr} + 6.53\mathrm{Al} \quad (1)$$

$$Fn2 = \mathrm{C} + 0.10\mathrm{Si} + 0.19\mathrm{Mn} + 0.23\mathrm{Cr} - 0.34\mathrm{S} \quad (2)$$

where, a content in percent by mass of a corresponding element is substituted for each symbol of an element in Formula (1) and Formula (2).

A crankshaft according to the present disclosure includes:
a pin section,
a journal section, and an arm section arranged between the pin section and the journal section,
at least the pin section and the journal section including:
a nitrided layer that is formed at an outer layer, and
a core portion that is further inward than the nitrided layer;
wherein:
the core portion consists of, in mass %,
C: 0.25% to 0.35%,
Si: 0.05 to 0.35%,
Mn: 0.85 to 1.20%,
P: 0.080% or less,
S: 0.030 to 0.100%,
Cr: 0.10% or less,
Ti: 0.050% or less,
Al: 0.050% or less,
N: 0.005 to 0.024%, and
O: 0.0100% or less, with
the balance being Fe and impurities;
and wherein:
Fn1 defined by Formula (1) is 1.00 to 2.05,
Fn2 defined by Formula (2) is 0.42 to 0.60, and
when, among inclusions in the core portion,
an inclusion in which a total of a content of Mn and a content of S in percent by mass is 80.0% or more is defined as an MnS single inclusion,
an inclusion in which a total of a content of Mn and a content of S in percent by mass is 15.0 to less than 80.0% is defined as an MnS composite inclusion,
an inclusion in which a total of a content of Al, a content of Ca, and a content of O in percent by mass is 80.0% or more, and a total of a content of Mn and a content of S in percent by mass is less than 15.0% is defined as a single oxide, and
an inclusion in which a total of a content of Al, a content of Ca, and a content of O in percent by mass is 15.0 to less than 80.0%, and a total of a content of Mn and a content of S in percent by mass is 15.0 to less than 80.0% is defined as an MnS composite oxide,
in the core portion:
a surface number density of a total of the MnS single inclusions having an equivalent circular diameter of 5.0 μm or more and the MnS composite inclusions having an equivalent circular diameter of 5.0 μm or more is $20/mm^2$ or more,
a ratio of a total number of the MnS single inclusions having an equivalent circular diameter of 1.0 μm or more and the MnS composite inclusions having an equivalent circular diameter of 1.0 μm or more with respect to a total number of inclusions having an equivalent circular diameter of 1.0 μm or more is 70% or more, and
a ratio of a number of the MnS composite oxides having an equivalent circular diameter of 1.0 μm or more with respect to a total number of the single oxides having an equivalent circular diameter of 1.0 μm or more and the MnS composite oxides having an equivalent circular diameter of 1.0 μm or more is 30% or more;

$$Fn1 = \mathrm{Mn} + 7.24\mathrm{Cr} + 6.53\mathrm{Al} \quad (1)$$

$$Fn2 = \mathrm{C} + 0.10\mathrm{Si} + 0.19\mathrm{Mn} + 0.23\mathrm{Cr} - 0.34\mathrm{S} \quad (2)$$

where, a content in percent by mass of a corresponding element is substituted for each symbol of an element in Formula (1) and Formula (2).

Advantageous Effects of Invention

The steel material according to the present disclosure is excellent in machinability, and when subjected to nitriding and made into a crankshaft, the steel material has excellent bending fatigue strength, excellent wear resistance, and an excellent bend-straightening property. The crankshaft according to the present disclosure has excellent bending fatigue strength, excellent wear resistance, and an excellent bend-straightening property.

DESCRIPTION OF EMBODIMENTS

Figure 1:
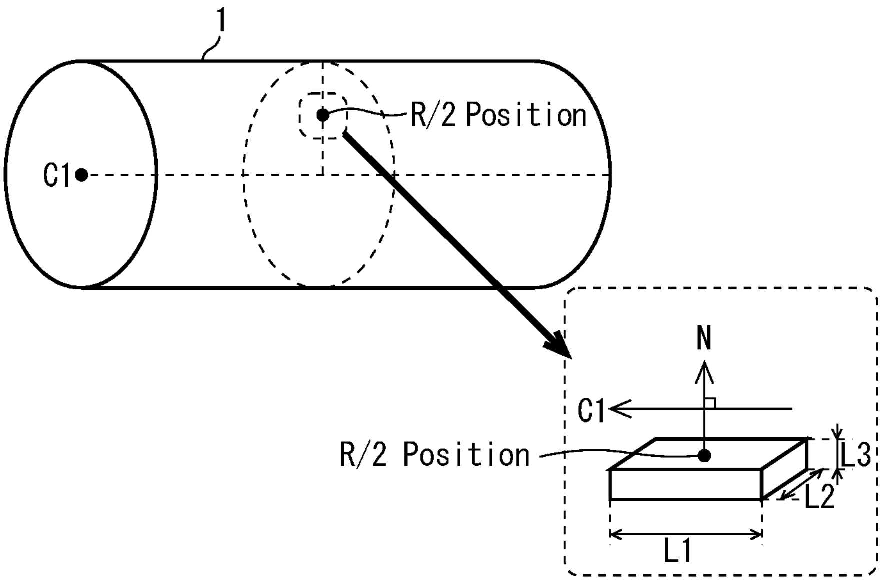
FIG. 1 is a schematic diagram for describing a position at which to take a sample for identifying inclusions from a steel material that will serve as a starting material for a crankshaft.

The present inventors conducted studies regarding a steel material to serve as the starting material for a crankshaft with which excellent machinability is obtained during a process for producing a crankshaft, and which exhibits excellent bending fatigue strength, excellent wear resistance, and an excellent bend-straightening property when subjected to nitriding and made into a crankshaft.

Firstly, the present inventors conducted studies regarding the chemical composition of a steel material which can enhance the aforementioned machinability, and which can enhance bending fatigue strength, wear resistance, and a bend-straightening property when made into a crankshaft. As a result, the present inventors considered that if a steel material has a chemical composition consisting of, in mass %, C: 0.25% to 0.35%, Si: 0.05 to 0.35%, Mn: 0.85 to 1.20%, P: 0.080% or less, S: 0.030 to 0.100%, Cr: 0.10% or less, Ti: 0.050% or less, Al: 0.050% or less, N: 0.005 to 0.024%, O: 0.0100% or less, Cu: 0 to 0.20%, Ni: 0 to 0.20%, Mo: 0 to 0.10%, Nb: 0 to 0.050%, Ca: 0 to 0.0100%, Bi: 0 to 0.30%, Te: 0 to 0.0100%, Zr: 0 to 0.0100%, and Pb: 0 to 0.09%, with the balance being Fe and impurities, there is a possibility that machinability can be enhanced, and in addition, in a case where the steel material is subjected to nitriding and made into a crankshaft, the bending fatigue strength, the wear resistance, and a bend-straightening property can be enhanced. Therefore, based on the aforementioned chemical composition, the present inventors conducted studies regarding the machinability, the bending fatigue strength, the wear resistance, and a bend-straightening property.

The bending fatigue strength after nitriding has a positive correlation with the hardness of a nitrided layer formed at the outer layer of the steel material after nitriding and the hardness of a core portion that is further inward than the nitrided layer. On the other hand, a bend-straightening property after nitriding has a negative correlation with the hardness of the nitrided layer of the steel material after nitriding. In addition, the machinability has a negative correlation with the hardness of the steel material before nitriding (that is, in the case of the steel material after nitriding, the core portion which is not affected by the nitriding). Therefore, in order to enhance the bending fatigue strength, wear resistance, and bend-straightening property after nitriding, and enhance the machinability of the steel material during the process for producing a crankshaft, it is necessary to control the hardness of the nitrided layer of the steel material after nitriding and the hardness of the core portion of the steel material after nitriding to within a certain range.

The hardness of the nitrided layer of the steel material after nitriding is determined by the hardness of the steel material before nitriding, and the margin of increase in the hardness of the steel material outer layer due to nitriding. Here, the phrase "margin of increase in the hardness of the steel material outer layer due to nitriding" means the difference between the hardness of the nitrided layer formed by nitriding and the hardness of the steel material before nitriding. In other words, the higher that the hardness of the steel material before nitriding (that is, the core portion of the steel material after nitriding) is, and the greater that the margin of increase in the hardness of the steel material outer layer due to nitriding is, the higher that the hardness of the nitrided layer of the steel material after nitriding will be.

Here, the present inventors considered that in a steel material having the aforementioned chemical composition, the hardness of the steel material before nitriding (that is, the core portion after nitriding) depends on the content of C, Si, Mn, and Cr that are elements which increase the hardness of the steel material by solid-solution strengthening, and the content of S that is an element which embrittles the steel material. In addition, the present inventors considered that the margin of increase in the hardness of the steel material outer layer due to nitriding depends on the content of Mn, Cr, and Al that are elements which have a high affinity for nitrogen.

Therefore, with respect to a steel material in which the content of each element of the chemical composition is within the range described above, the present inventors investigated the relation between the content of elements (Mn, Cr, and Al) which increase the hardness of the steel material outer layer after nitriding, the content of elements (C, Si, Mn, Cr, and S) which influence the hardness of the core portion after nitriding, and the machinability, the bending fatigue strength, the wear resistance and the bend-straightening property. As a result, the present inventors obtained the following findings.

Fn1 is defined by Formula (1), and Fn2 is defined by Formula (2).

$$Fn1 = \mathrm{Mn} + 7.24\mathrm{Cr} + 6.53\mathrm{Al} \quad (1)$$

$$Fn2 = \mathrm{C} + 0.10\mathrm{Si} + 0.19\mathrm{Mn} + 0.23\mathrm{Cr} - 0.34\mathrm{S} \quad (2)$$

Where, a content in percent by mass of a corresponding element is substituted for each symbol of an element in Formula (1) and Formula (2).

Fn1 is an index of the margin of increase in the hardness of the steel material outer layer due to nitriding in a steel material in which the content of each element of the chemical composition is within the range described above. That is, on the precondition that the content of each element of the chemical composition of the steel material is within the range described above, Fn1 relates to the bending fatigue strength and the bend-straightening property of the steel material after nitriding. If Fn1 is less than 1.00, even if the content of each element of the chemical composition is within the range of the present embodiment and Fn2 is within the range of the present embodiment, sufficient bending fatigue strength will not be obtained in a crankshaft that is the steel material after nitriding. On the other hand, if Fn1 is more than 2.05, even if the content of each element of the chemical composition is within the range of the present embodiment and Fn2 is within the range of the present embodiment, the bend-straightening property of the steel material after nitriding will decrease. If Fn1 is 1.00 to 2.05, on the precondition that each element of the chemical composition is within the range of the present embodiment and Fn2 is within the range of the present embodiment, sufficient bending fatigue strength and a sufficient bend-straightening property will be obtained in the crankshaft.

Fn2 is an index of the hardness of the steel material before nitriding (that is, the core portion of the steel material after nitriding) with respect to a steel material in which the content of each element of the chemical composition is within the range described above. On the precondition that the chemical composition of the steel material is within the range described above, Fn2 relates to the machinability of the steel material, and the bending fatigue strength of the steel material after nitriding. If Fn2 is less than 0.42, even if the content of each element of the chemical composition is within the range of the present embodiment and Fn1 is within the range of the present embodiment, sufficient bending fatigue strength will not be obtained in a crankshaft that is the steel material after nitriding. On the other hand, if Fn2 is more than 0.60, even if the content of each element of the chemical composition is within the range of the present embodiment and Fn1 is within the range of the present embodiment, sufficient machinability will not be obtained in the steel material. If Fn2 is 0.42 to 0.60, on the precondition that each element of the chemical composition is within the range of the present embodiment and Fn1 is within the range of the present embodiment, sufficient machinability will be obtained in the steel material, and sufficient bending fatigue strength will be obtained in the crankshaft.

As described above, by making the chemical composition fall within an appropriate range, the machinability of the steel material, and the bending fatigue strength and the bend-straightening property of the steel material after nitriding can be increased to a certain extent. Therefore, the present inventors also investigated increasing the machinability of the steel material, and the wear resistance of the steel material after nitriding by means of factors other than the chemical composition. Here, the present inventors conducted studies that focused on inclusions with respect to not only machinability but also with respect to wear resistance. As a result, the present inventors obtained the following findings with respect to inclusions that affect machinability and wear resistance. Inclusions in the following description are defined as follows.

(a) When the mass percent of an inclusion is taken as 100%, an inclusion in which the total content of Mn and S in percent by mass is 80.0% or more is defined as an "MnS single inclusion".

(b) When the mass percent of an inclusion is taken as 100%, an inclusion in which the total content of Mn and S in percent by mass is 15.0 to less than 80.0% is defined as an "MnS composite inclusion".

(c) When the mass percent of an inclusion is taken as 100%, an inclusion in which the total content of Al, Ca, and O in percent by mass is 80.0% or more, and the total content of Mn and S in percent by mass is less than 15.0% is defined as a "single oxide".

(d) When the mass percent of an inclusion is taken as 100%, an inclusion in which the total content of Mn and S in percent by mass is 15.0 to less than 80.0%, and the total content of Al, Ca, and O in percent by mass is 15.0 to less than 80.0% is defined as an "MnS composite oxide".

Hereunder, MnS single inclusions and MnS composite inclusions are referred to generically as "MnS-based inclusions". Note that, as described in the above definitions, MnS composite oxides are included in the definition of MnS composite inclusions.

The machinability is influenced not only by the hardness of the steel material before nitriding (the core portion of the steel material after nitriding), but also by inclusions. Specifically, the higher that the surface number density (/mm$^2$) of MnS-based inclusions (MnS single inclusions and MnS composite inclusions) present in the steel material is, the higher that the machinability will be. However, if the size of MnS-based inclusions is too small, the influence on the machinability will be small. Specifically, if the equivalent circular diameter of the MnS-based inclusions is less than 5.0 μm, the influence on the machinability of the steel material will be extremely small. Accordingly, to enhance the machinability of the steel material, it is effective to increase the surface number density of MnS-based inclusions having an equivalent circular diameter of 5.0 μm or more. Note that, the term "equivalent circular diameter" means the diameter of a circle in a case where the area of the respective inclusions is converted into a circle having the same area.

In addition, the wear resistance of the steel material after nitriding is also influenced by inclusions. A compound layer is formed at the outermost layer of a nitrided layer formed at the outer layer of the steel material after nitriding. In a crankshaft produced by performing nitriding, wear progresses as a result of a crack occurring and propagating in the aforementioned compound layer and leading to the compound layer peeling off. The compound layer is a layer that is formed as the result of the properties of a portion that was originally the steel material changing as a result of containing a large amount of nitrogen due to nitriding. In a case where inclusions are present in the outer layer of the steel material before nitriding, if the outer layer undergoes a change into a compound layer due to nitriding, the inclusions will be included within the compound layer.

The present inventors considered that the occurrence of a crack in the compound layer may be caused by inclusions in the compound layer. Therefore, the present inventors focused on the kinds of inclusions, and investigated the relation thereof with the occurrence of cracks in the compound layer. As a result, it was revealed that most cracks in a compound layer that become a cause of wear originate from hard oxides as starting points. Further, it is difficult for soft MnS-based inclusions to become a starting point for a crack in a compound layer, and in addition, it is also difficult for MnS composite oxides, which are composite inclusions of MnS-based inclusions and single oxides, to become a starting point for a crack in a compound layer. Therefore, the present inventors considered that in order to increase wear resistance in a crankshaft produced by performing nitriding, it is effective to reduce single oxides as much as possible, or to make single oxides into composite inclusions with MnS (MnS composite oxides).

However, because oxides in the molten steel act as formation nuclei for MnS-based inclusions, oxygen is required to a certain extent in the molten steel for formation of MnS-based inclusions. Consequently, single oxides are also formed to a certain extent in the steel material. Therefore, as well as ensuring the machinability of the steel material, in order to also increase the wear resistance of the steel material after nitriding, the present inventors focused on the aforementioned MnS-based inclusions (MnS single inclusions and MnS composite inclusions), single oxides, and MnS composite oxides, and conducted further studies regarding the relation between inclusions in the steel material and the machinability and the wear resistance of the steel material. As a result, the present inventors discovered that if the inclusions in the steel material satisfy the following (I) to (III), on the precondition that the contents of the elements of the chemical composition are within the range of the present embodiment and that Fn1 and Fn2 are within the respective ranges thereof in the present embodiment, the machinability of the steel material and also the wear resistance of a crankshaft produced by subjecting the steel material to nitriding can be further enhanced.

(I) In the steel material, the surface number density of the total of MnS single inclusions having an equivalent circular diameter of 5.0 μm or more and MnS composite inclusions having an equivalent circular diameter of 5.0 μm or more is 20/mm$^2$ or more.

(II) In the steel material, the ratio of the total number of MnS single inclusions having an equivalent circular diameter of 1.0 μm or more and MnS composite inclusions having an equivalent circular diameter of 1.0 μm or more with respect to the total number of inclusions having an equivalent circular diameter of 1.0 μm or more is 70% or more.

(III) In the steel material, the ratio of the number of MnS composite oxides having an equivalent circular diameter of 1.0 μm or more with respect to the total number of single oxides having an equivalent circular diameter of 1.0 μm or more and MnS composite oxides having an equivalent circular diameter of 1.0 μm or more is 30% or more.

As described above, the steel material to serve as a starting material for a crankshaft and the crankshaft of the present embodiment were completed as a result of conducting studies that focused on the chemical composition and the inclusions that can act as starting points for cracks in a nitrided layer (in particular, the compound layer), and are as follows.

[1]

A steel material consisting of, in mass %,

C: 0.25% to 0.35%,
Si: 0.05 to 0.35%,
Mn: 0.85 to 1.20%,
P: 0.080% or less,
S: 0.030 to 0.100%,
Cr: 0.10% or less,
Ti: 0.050% or less,
Al: 0.050% or less,
N: 0.005 to 0.024%, and
O: 0.0100% or less, with
the balance being Fe and impurities,
wherein:
Fn1 defined by Formula (1) is 1.00 to 2.05,
Fn2 defined by Formula (2) is 0.42 to 0.60, and
when, among inclusions in the steel material, an inclusion in which a total of a content of Mn and a content of S in percent by mass is 80.0% or more is defined as an MnS single inclusion, an inclusion in which a total of a content of Mn and a content of S in percent by mass is 15.0 to less than 80.0% is defined as an MnS composite inclusion, an inclusion in which a total of a content of Al, a content of Ca, and a content of O in percent by mass is 80.0% or more, and a total of a content of Mn and a content of S in percent by mass is less than 15.0% is defined as a single oxide, and an inclusion in which a total of a content of Al, a content of Ca, and a content of O in percent by mass is 15.0 to less than 80.0%, and a total of a content of Mn and a content of S in percent by mass is 15.0 to less than 80.0% is defined as an MnS composite oxide, in the steel material:

a surface number density of a total of the MnS single inclusions having an equivalent circular diameter of 5.0 μm or more and the MnS composite inclusions having an equivalent circular diameter of 5.0 μm or more is 20/mm$^2$ or more, a ratio of a total number of the MnS single inclusions having an equivalent circular diameter of 1.0 μm or more and the MnS composite inclusions having an equivalent circular diameter of 1.0 μm or more with respect to a total number of inclusions having an equivalent circular diameter of 1.0 μm or more is 70% or more, and a ratio of a number of the MnS composite oxides having an equivalent circular diameter of 1.0 μm or more with respect to a total number of the single oxides having an equivalent circular diameter of 1.0 μm or more and the MnS composite oxides having an equivalent circular diameter of 1.0 μm or more is 30% or more;

$$Fn1 = \mathrm{Mn} + 7.24\mathrm{Cr} + 6.53\mathrm{Al} \quad (1)$$

$$Fn2 = \mathrm{C} + 0.10\mathrm{Si} + 0.19\mathrm{Mn} + 0.23\mathrm{Cr} - 0.34\mathrm{S} \quad (2)$$

where, a content in percent by mass of a corresponding element is substituted for each symbol of an element in Formula (1) and Formula (2).

[2]

The steel material according to [1], containing, in lieu of a part of the Fe, one or more elements selected from a group consisting of:

Cu: 0.20% or less,
Ni: 0.20% or less,
Mo: 0.10% or less,
Nb: 0.050% or less,
Ca: 0.0100% or less,
Bi: 0.30% or less,
Te: 0.0100% or less,
Zr: 0.0100% or less, and
Pb: 0.09% or less.

[3]

A crankshaft, including:

a pin section, a journal section, and an arm section arranged between the pin section and the journal section, at least the pin section and the journal section including:

a nitrided layer that is formed at an outer layer, and a core portion that is further inward than the nitrided layer;

wherein:

the core portion consists of, in mass %,

C: 0.25% to 0.35%,

Si: 0.05 to 0.35%,

Mn: 0.85 to 1.20%,

P: 0.080% or less,

S: 0.030 to 0.100%,

Cr: 0.10% or less,

Ti: 0.050% or less,

Al: 0.050% or less,

N: 0.005 to 0.024%, and

O: 0.0100% or less, with the balance being Fe and impurities;

and wherein:

Fn1 defined by Formula (1) is 1.00 to 2.05,

Fn2 defined by Formula (2) is 0.42 to 0.60, and when, among inclusions in the core portion, an inclusion in which a total of a content of Mn and a content of S in percent by mass is 80.0% or more is defined as an MnS single inclusion, an inclusion in which a total of a content of Mn and a content of S in percent by mass is 15.0 to less than 80.0% is defined as an MnS composite inclusion, an inclusion in which a total of a content of Al, a content of Ca, and a content of O in percent by mass is 80.0% or more, and a total of a content of Mn and a content of S in percent by mass is less than 15.0% is defined as a single oxide, and an inclusion in which a total of a content of Al, a content of Ca, and a content of O in percent by mass is 15.0 to less than 80.0%, and a total of a content of Mn and a content of S in percent by mass is 15.0 to less than 80.0% is defined as an MnS composite oxide, in the core portion:

a surface number density of a total of the MnS single inclusions having an equivalent circular diameter of 5.0 μm or more and the MnS composite inclusions having an equivalent circular diameter of 5.0 μm or more is 20/mm$^2$ or more, a ratio of a total number of the MnS single inclusions having an equivalent circular diameter of 1.0 μm or more and the MnS composite inclusions having an equivalent circular diameter of 1.0 μm or more with respect to a total number of inclusions having an equivalent circular diameter of 1.0 μm or more is 70% or more, and a ratio of a number of the MnS composite oxides having an equivalent circular diameter of 1.0 μm or more with respect to a total number of the single oxides having an equivalent circular diameter of 1.0 μm or more and the MnS composite oxides having an equivalent circular diameter of 1.0 μm or more is 30% or more;

$$Fn1 = \mathrm{Mn} + 7.24\mathrm{Cr} + 6.53\mathrm{Al} \quad (1)$$

$$Fn2 = \mathrm{C} + 0.10\mathrm{Si} + 0.19\mathrm{Mn} + 0.23\mathrm{Cr} - 0.34\mathrm{S} \quad (2)$$

where, a content in percent by mass of a corresponding element is substituted for each symbol of an element in Formula (1) and Formula (2).

[4]

The crankshaft according to [3], wherein the core portion further contains, in lieu of a part of the Fe, one or more elements selected from a group consisting of:

Cu: 0.20% or less,

Ni: 0.20% or less,

Mo: 0.10% or less,

Nb: 0.050% or less,

Ca: 0.0100% or less,

Bi: 0.30% or less,

Te: 0.0100% or less,

Zr: 0.0100% or less, and

Pb: 0.09% or less.

Hereunder, the steel material to serve as a starting material for a crankshaft and the crankshaft of the present embodiment are described. Note that, the symbol "%" in relation to an element means mass percent unless otherwise stated. Further, in the present description, the term "nitriding" also includes a nitrocarburizing treatment.

[Chemical Composition]

The steel material of the present embodiment serves as a starting material for a crankshaft. The chemical composition of the steel material of the present embodiment contains the following elements.

C: 0.25% to 0.35%

Carbon (C) increases the bending fatigue strength of the steel material after nitriding (crankshaft). If the content of C is less than 0.25%, the aforementioned advantageous effect will not be sufficiently obtained even if the contents of other elements are within the range of the present embodiment. On the other hand, if the content of C is more than 0.35%, even if the contents of other elements are within the range of the present embodiment, the hardness of the core portion of the crankshaft will be too high, and the hardness of the nitrided layer will also be too high. In such a case, a bend-straightening property of the crankshaft will decrease. Therefore, the content of C is to be 0.25 to 0.35%. A preferable lower limit of the content of C is 0.26%, and more preferably is 0.27%.

Si: 0.05 to 0.35%

Silicon (Si) increases the bending fatigue strength of the crankshaft. Si also deoxidizes the steel. If the content of Si is less than 0.05%, the aforementioned advantageous effect will not be sufficiently obtained even if the contents of other elements are within the range of the present embodiment. On the other hand, if the content of Si is more than 0.35%, even if the contents of other elements are within the range of the present embodiment, the hardness of the nitrided layer of the crankshaft will be too high, and the bend-straightening property of the crankshaft will decrease. Therefore, the content of Si is to be 0.05 to 0.35%. A preferable lower limit of the content of Si is 0.07%, more preferably is 0.09%, and further preferably is 0.10%. A preferable upper limit of the content of Si is 0.33%, more preferably is 0.31%, and further preferably is 0.30%.

Mn: 0.85 to 1.20%

Manganese (Mn) increases the bending fatigue strength of the crankshaft. Mn also deoxidizes the steel. If the content of Mn is less than 0.85%, the aforementioned advantageous effects will not be sufficiently obtained even if the contents of other elements are within the range of the present embodiment. On the other hand, if the content of Mn is more than 1.20%, even if the contents of other elements are within the range of the present embodiment, the hardness of the nitrided layer of the crankshaft will be too high, and the bend-straightening property of the crankshaft will decrease. Therefore, the content of Mn is to be 0.85 to 1.20%. A preferable lower limit of the content of Mn is 0.87%, more preferably is 0.89%, and further preferably is 0.90%. A preferable upper limit of the content of Mn is 1.18%, more preferably is 1.16%, and further preferably is 1.14%.

P: 0.080% or Less

Phosphorus (P) is an impurity that is unavoidably contained. That is, the content of P is more than 0%. If the content of P is more than 0.080%, the bending fatigue strength of the crankshaft will decrease even if the contents of other elements are within the range of the present embodiment. Therefore, the content of P is to be 0.080% or less. A preferable upper limit of the content of P is 0.050%, and more preferably is 0.030%. The content of P is preferably as low as possible. However, excessively reducing the content of P will raise the production cost. Therefore, a preferable lower limit of the content of P is 0.001%, and more preferably is 0.002%.

S: 0.030 to 0.100%

Sulfur (S) enhances the machinability of the steel material. If the content of S is less than 0.030%, the aforementioned advantageous effect will not be sufficiently obtained even if the contents of other elements are within the range of the present embodiment. On the other hand, if the content of S is more than 0.100%, even if the contents of other elements are within the range of the present embodiment, the castability of the steel material will decrease. Therefore, the content of S is to be 0.030 to 0.100%. A preferable lower limit of the content of S is 0.035%, more preferably is 0.037%, and further preferably is 0.040%. A preferable upper limit of the content of S is 0.095%, more preferably is 0.090%, further preferably is 0.085%, and further preferably is 0.080%.

Cr: 0.10% or Less

Chromium (Cr) is an impurity that is unavoidably contained. That is, the content of Cr is more than 0%. If the content of Cr is more than 0.10%, the bend-straightening property of the crankshaft will decrease even if the contents of other elements are within the range of the present embodiment. Therefore, the content of Cr is to be 0.10% or less. The content of Cr is preferably as low as possible. However, excessively reducing the content of Cr will raise the production cost. Accordingly, a preferable lower limit of the content of Cr is 0.01%, and more preferably is 0.02%.

Ti: 0.050% or Less

Titanium (Ti) is unavoidably contained. That is, the content of Ti is more than 0%. Ti combines with N to form TiN, which suppresses coarsening of grains by the pinning effect and increases the bending fatigue strength of the crankshaft. If even a small amount of Ti is contained, the aforementioned advantageous effect will be obtained to a certain extent. However, if the content of Ti is more than 0.050%, even if the contents of other elements are within the range of the present embodiment, coarse TiN will be formed and the bending fatigue strength of the crankshaft will decrease. Accordingly, the content of Ti is 0.050% or less. A preferable lower limit of the content of Ti is 0.001%, more preferably is 0.003%, and further preferably is 0.005%. A preferable upper limit of the content of Ti is 0.045%, more preferably is 0.040%, and further preferably is 0.030%.

Al: 0.050% or Less

Aluminum (Al) is unavoidably contained. That is, the content of Al is more than 0%. Al combines with nitrogen during nitriding and forms AlN, and thus increases the hardness of the nitrided layer of the crankshaft and thereby increases the bending fatigue strength of the crankshaft. If even a small amount of Al is contained, the aforementioned advantageous effect will be obtained to a certain extent. However, if the content of Al is more than 0.050%, even if the contents of other elements are within the range of the present embodiment, the hardness of the nitrided layer of the crankshaft will be too high and the bend-straightening property of the crankshaft will decrease. Therefore, the content of Al is to be 0.050% or less. A preferable upper limit of the content of Al is 0.045%, more preferably is 0.040%, further preferably is 0.035%, and further preferably is 0.030%. A preferable lower limit of the content of Al is 0.001%, more preferably is 0.002%, and further preferably is 0.005%. As used herein, the term "content of Al" means the content of Al including oxides in the steel (total Al).

N: 0.005 to 0.024%

Nitrogen (N) combines with Ti to form TiN which suppresses coarsening of grains by the pinning effect and increases the bending fatigue strength of the crankshaft. If the content of N is less than 0.005%, the aforementioned advantageous effect will not be sufficiently obtained even if the contents of other elements are within the range of the present embodiment. On the other hand, if the content of N is more than 0.024%, the hot workability of the steel material will decrease even if the contents of other elements are within the range of the present embodiment. Therefore, the content of N is to be 0.005 to 0.024%. A preferable lower limit of the content of N is 0.006%, more preferably is 0.008%, and further preferably is 0.010%. A preferable upper limit of the content of N is 0.022%, more preferably is 0.021%, and further preferably is 0.020%.

O: 0.0100% or Less

Oxygen (O) is an impurity that is unavoidably contained. That is, the content of O is more than 0%. O forms oxides in the steel material. If the content of O is more than 0.0100%, even if the contents of other elements are within the range of the present embodiment, coarse oxides will form and the bending fatigue strength of the crankshaft will decrease, and the wear resistance will also decrease. Therefore, the content of O is to be 0.0100% or less. A preferable upper limit of the content of O is 0.0080%, more preferably is 0.0060%, and further preferably is 0.0050%. The content of O is preferably as low as possible. However, excessively reducing the content of O will raise the production cost. Therefore, a preferable lower limit of the content of O is 0.0001%, and more preferably is 0.0005%.

The balance of the chemical composition of the steel material of the present embodiment is Fe and impurities. Here, the term "impurities" refers to components which, when industrially producing the steel material, are mixed in from ore or scrap that is used as a raw material or from the production environment or the like, and which are not components that are intentionally contained in the steel material. Examples of such impurities are as follows: Co: 0.02% or less, Sn: 0.02% or less, and Zn: 0.02% or less.

[Regarding Optional Elements]

[First Group of Optional Elements]

The chemical composition of the steel material of the present embodiment may further contain one or more elements selected from the group consisting of Cu, Ni, Mo and Nb in lieu of a part of Fe. These elements are optional elements, and each of these elements increases the bending fatigue strength of the crankshaft.

Cu: 0.20% or Less

Copper (Cu) is an optional element, and does not have to be contained. That is, the content of Cu may be 0%. When contained, that is, when the content of Cu is more than 0%, Cu dissolves in the steel material and increases the bending fatigue strength of the crankshaft. If even a small amount of Cu is contained, the aforementioned advantageous effect will be obtained to a certain extent. However, if the content of Cu is more than 0.20%, the bend-straightening property of the crankshaft will decrease even if the contents of other elements are within the range of the present embodiment. Therefore, the content of Cu is to be 0.20% or less. That is, the content of Cu is to be 0 to 0.20%. A preferable lower limit of the content of Cu is more than 0%, more preferably is 0.01%, further preferably is 0.02%, further preferably is 0.05%, and further preferably is 0.07%. A preferable upper limit of the content of Cu is 0.19%, more preferably is 0.18%, and further preferably is 0.17%.

Ni: 0.20% or Less

Nickel (Ni) is an optional element, and does not have to be contained. That is, the content of Ni may be 0%. When contained, that is, when the content of Ni is more than 0%, Ni dissolves in the steel material and increases the bending fatigue strength of the crankshaft. If even a small amount of Ni is contained, the aforementioned advantageous effect will be obtained to a certain extent. However, if the content of Ni is more than 0.20%, the bend-straightening property of the crankshaft will decrease even if the contents of other elements are within the range of the present embodiment. Therefore, the content of Ni is to be 0.20% or less. That is, the content of Ni is to be 0 to 0.20%. A preferable lower limit of the content of Ni is more than 0%, more preferably is 0.01%, further preferably is 0.02%, further preferably is 0.05%, and further preferably is 0.07%. A preferable upper limit of the content of Ni is 0.19%, more preferably is 0.18%, and further preferably is 0.17%.

Mo: 0.10% or Less

Molybdenum (Mo) is an optional element, and does not have to be contained. That is, the content of Mo may be 0%. When contained, that is, when the content of Mo is more than 0%, Mo dissolves in the steel material and increases the bending fatigue strength of the crankshaft. If even a small amount of Mo is contained, the aforementioned advantageous effect will be obtained to a certain extent. However, if the content of Mo is more than 0.10%, the bend-straightening property of the crankshaft will decrease even if the contents of other elements are within the range of the present embodiment. Therefore, the content of Mo is to be 0.10% or less. That is, the content of Mo is to be 0 to 0.10%. A preferable lower limit of the content of Mo is more than 0%, more preferably is 0.01%, further preferably is 0.02%, and further preferably is 0.03%. A preferable upper limit of the content of Mo is 0.09%, and more preferably is 0.08%.

Nb: 0.050% or Less

Niobium (Nb) is an optional element, and does not have to be contained. That is, the content of Nb may be 0%. When contained, that is, when the content of Nb is more than 0%, Nb forms carbides, nitrides or carbo-nitrides, thereby refining the grains by the pinning effect and increasing the bending fatigue strength of the crankshaft. If even a small amount of Nb is contained, the aforementioned advantageous effect will be obtained to a certain extent. However, if the content of Nb is more than 0.050%, even if the contents of other elements are within the range of the present embodiment, the bend-straightening property of the crankshaft will decrease. Therefore, the content of Nb is to be 0.050% or less. That is, the content of Nb is to be 0 to 0.050%. A preferable lower limit of the content of Nb is more than 0%, more preferably is 0.001%, further preferably is 0.003%, and further preferably is 0.005%. A preferable upper limit of the content of Nb is 0.040%, and more preferably is 0.030%.

[Second Group of Optional Elements]

The steel material of the present embodiment may further contain one or more elements selected from the group consisting of Ca, Bi, Te, Zr, and Pb in lieu of a part of Fe. These elements are optional elements, and each of these elements enhances the machinability of the steel material.

Ca: 0.0100% or Less

Calcium (Ca) is an optional element, and does not have to be contained. That is, the content of Ca may be 0%. When contained, that is, when the content of Ca is more than 0%, Ca enhances the machinability of the steel material. If even a small amount of Ca is contained, the aforementioned advantageous effect will be obtained to a certain extent. However, if the content of Ca is more than 0.0100%, even if the contents of other elements are within the range of the present embodiment, Ca will form coarse oxides, and the bending fatigue strength of the crankshaft will decrease. Therefore, the content of Ca is to be 0.0100% or less. That is, the content of Ca is to be 0 to 0.0100%. A preferable lower limit of the content of Ca is more than 0%, more preferably is 0.0001%, further preferably is 0.0002%, and further preferably is 0.0003%. A preferable upper limit of the content of Ca is 0.0090%, and more preferably is 0.0080%.

Bi: 0.30% or Less

Bismuth (Bi) is an optional element, and does not have to be contained. That is, the content of Bi may be 0%. When contained, that is, when the content of Bi is more than 0%, Bi enhances the machinability of the steel material. If even a small amount of Bi is contained, the aforementioned advantageous effect will be obtained to a certain extent. However, if the content of Bi is more than 0.30%, the bending fatigue strength of the crankshaft will decrease even if the contents of other elements are within the range of the present embodiment. Therefore, the content of Bi is to be 0.30% or less. That is, the content of Bi is to be 0 to 0.30%. A preferable lower limit of the content of Bi is more than 0%, more preferably is 0.01%, further preferably is 0.02%, and further preferably is 0.05%. A preferable upper limit of the content of Bi is 0.27%, and more preferably is 0.25%.

Te: 0.0100% or Less

Tellurium (Te) is an optional element, and does not have to be contained. That is, the content of Te may be 0%. When contained, that is, when the content of Te is more than 0%, Te enhances the machinability of the steel material. If even a small amount of Te is contained, the aforementioned advantageous effect will be obtained to a certain extent. However, if the content of Te is more than 0.0100%, the bending fatigue strength of the crankshaft will decrease even if the contents of other elements are within the range of the present embodiment. Therefore, the content of Te is to be 0.0100% or less. That is, the content of Te is to be 0 to 0.0100%. A preferable lower limit of the content of Te is more than 0%, more preferably is 0.0001%, further preferably is 0.0002%, and further preferably is 0.0003%. A preferable upper limit of the content of Te is 0.0090%, and more preferably is 0.0080%.

Zr: 0.0100% or Less

Zirconium (Zr) is an optional element, and does not have to be contained. That is, the content of Zr may be 0%. When contained, that is, when the content of Zr is more than 0%, Zr enhances the machinability of the steel material. If even a small amount of Zr is contained, the aforementioned advantageous effect will be obtained to a certain extent. However, if the content of Zr is more than 0.0100%, the bending fatigue strength of the crankshaft will decrease even if the contents of other elements are within the range of the present embodiment. Therefore, the content of Zr is to be 0.0100% or less. That is, the content of Zr is to be 0 to 0.0100%. A preferable lower limit of the content of Zr is more than 0%, more preferably is 0.0001%, further preferably is 0.0002%, and further preferably is 0.0003%. A preferable upper limit of the content of Zr is 0.0090%, and more preferably is 0.0080%.

Pb: 0.09% or Less

Lead (Pb) is an optional element, and does not have to be contained. That is, the content of Pb may be 0%. When contained, that is, when the content of Pb is more than 0%, Pb enhances the machinability of the steel material. If even a small amount of Pb is contained, the aforementioned advantageous effect will be obtained to a certain extent. However, if the content of Pb is more than 0.09%, the bending fatigue strength of the crankshaft will decrease even if the contents of other elements are within the range of the present embodiment. Therefore, the content of Pb is to be 0.09% or less. That is, the content of Pb is to be 0 to 0.09%. A preferable lower limit of the content of Pb is more than 0%, more preferably is 0.01%, further preferably is 0.02%, and further preferably is 0.05%. A preferable upper limit of the content of Pb is 0.08%, and more preferably is 0.07%.

[Regarding Fn1 and Fn2]

In addition, in the chemical composition of the steel material of the present embodiment, on the precondition that the content of each element of the chemical composition is within the range of the present embodiment, Fn1 defined by Formula (1) is 1.00 to 2.05, and Fn2 defined by Formula (2) is 0.42 to 0.60%.

$$Fn1 = \mathrm{Mn} + 7.24\mathrm{Cr} + 6.53\mathrm{Al} \tag{1}$$

$$Fn2 = \mathrm{C} + 0.10\mathrm{Si} + 0.19\mathrm{Mn} + 0.23\mathrm{Cr} - 0.34\mathrm{S} \tag{2}$$

Where, a content in percent by mass of a corresponding element is substituted for each symbol of an element in Formula (1) and Formula (2).

[Regarding Fn1]

On the precondition that, in the chemical composition, the content of each element is within the range of the present embodiment and Fn2 is within the range of the present embodiment, Fn1 defined by Formula (1) is an index of the hardness of the nitrided layer formed at the outer layer of the steel material after nitriding (crankshaft). Therefore, in a steel material in which the content of each element of the chemical composition is within the range of the present embodiment, Fn1 relates to the bending fatigue strength of the crankshaft and the bend-straightening property of the crankshaft. Specifically, if Fn1 is less than 1.00, even if the content of each element of the chemical composition is within the range of the present embodiment and Fn2 is within the range of the present embodiment, sufficient bending fatigue strength will not be obtained in the crankshaft. On the other hand, if Fn1 is more than 2.05, even if the content of each element of the chemical composition is within the range of the present embodiment and Fn2 is within the range of the present embodiment, the bend-straightening property of the crankshaft will decrease. If Fn1 is 1.00 to 2.05, on the precondition that the content of each element of the chemical composition is within the range of the present embodiment and Fn2 is within the range of the present embodiment, sufficient bending fatigue strength will be obtained in the crankshaft, and the bend-straightening property of the crankshaft will also sufficiently increase. A preferable lower limit of Fn1 is 1.02, and more preferably is 1.03. A preferable upper limit of Fn1 is 2.03, more preferably is 2.01, and further preferably is 2.00.

[Regarding Fn2]

On the precondition that, in the chemical composition, the content of each element is within the range of the present embodiment and Fn1 is within the range of the present embodiment, Fn2 defined by Formula (2) is an index of the hardness of the steel material before nitriding (that is, the steel material that corresponds to the core portion of the crankshaft). Therefore, in a steel material in which the content of each element of the chemical composition is within the range of the present embodiment, Fn2 relates to the bending fatigue strength of the crankshaft and the machinability of the steel material. Specifically, if Fn2 is less than 0.42, even if the content of each element of the chemical composition is within the range of the present embodiment and Fn1 is within the range of the present embodiment, sufficient bending fatigue strength will not be obtained in the crankshaft. On the other hand, if Fn2 is more than 0.60, even if the content of each element of the chemical composition is within the range of the present embodiment and Fn1 is within the range of the present embodiment, sufficient machinability will not be obtained in the steel material. If Fn2 is 0.42 to 0.60, on the precondition that the content of each element of the chemical composition is within the range of the present embodiment and Fn1 is within the range of the present embodiment, sufficient bending fatigue strength will be obtained in the crankshaft, and the machinability of the steel material will also sufficiently increase. A preferable lower limit of Fn2 is 0.43, more preferably is 0.44, and further preferably is 0.45. A preferable upper limit of Fn2 is 0.58, more preferably is 0.57, and further preferably is 0.56.

[Regarding Inclusions in Steel Material]

In the steel material of the present embodiment, inclusions are defined as follows.

(a) When the mass percent of an inclusion is taken as 100%, an inclusion in which the total content of Mn and S in percent by mass is 80.0% or more is defined as an "MnS single inclusion".

(b) When the mass percent of an inclusion is taken as 100%, an inclusion in which the total content of Mn and S in percent by mass is 15.0 to less than 80.0% is defined as an "MnS composite inclusion".

(c) When the mass percent of an inclusion is taken as 100%, an inclusion in which the total content of Al, Ca, and O in percent by mass is 80.0% or more, and the total content of Mn and S in percent by mass is less than 15.0% is defined as a "single oxide".

(d) When the mass percent of an inclusion is taken as 100%, an inclusion in which the total content of Mn and S in percent by mass is 15.0 to less than 80.0%, and the total content of Al, Ca, and O in percent by mass is 15.0 to less than 80.0% is defined as an "MnS composite oxide".

As described in the above definitions, MnS composite oxides are included in the definition of MnS composite inclusions.

In the steel material of the present embodiment, inclusions satisfy the following conditions.

(I) In the steel material, the surface number density of the total of MnS single inclusions having an equivalent circular diameter of 5.0 μm or more and MnS composite inclusions having an equivalent circular diameter of 5.0 μm or more is $20/mm^2$ or more.

(II) In the steel material, the ratio of the total number of MnS single inclusions having an equivalent circular diameter of 1.0 μm or more and MnS composite inclusions having an equivalent circular diameter of 1.0 μm or more with respect to the total number of inclusions having an equivalent circular diameter of 1.0 μm or more is 70% or more.

(III) In the steel material, the ratio of the number of MnS composite oxides having an equivalent circular diameter of 1.0 μm or more with respect to the total number of single oxides having an equivalent circular diameter of 1.0 μm or more and MnS composite oxides having an equivalent circular diameter of 1.0 μm or more is 30% or more.

Hereunder, (I) to (III) are described.

[Regarding (I)]

Let the MnS single inclusions and the MnS composite inclusions be defined as "MnS-based inclusions". The MnS-based inclusions enhance the machinability of the steel material. Therefore, if the surface number density ($/mm^2$) of MnS-based inclusions is high, the machinability of the steel material will increase. However, if the size of the MnS-based inclusions is too small, the MnS-based inclusions will not contribute to improving the machinability of the steel material. In the case of a steel material having the aforementioned chemical composition in which the content of each element is within the range of the present embodiment and Fn1 and Fn2 are within the range of the present embodiment, it is difficult for MnS-based inclusions having an equivalent circular diameter of less than 5.0 μm to contribute to improving the machinability of the steel material. On the other hand, MnS-based inclusions having an equivalent circular diameter of 5.0 μm or more markedly increase the machinability of the steel material.

Let the surface number density of the MnS-based inclusions (MnS single inclusions and MnS composite inclusions) having an equivalent circular diameter of 5.0 μm or more be defined as "surface number density SN ($/mm^2$)". If the surface number density SN is $20/mm^2$ or more, the machinability of a steel material having the aforementioned chemical composition in which the content of each element is within the range of the present embodiment and Fn1 and Fn2 are within the range of the present embodiment can be sufficiently enhanced. A preferable lower limit of the surface number density of MnS-based inclusions having an equivalent circular diameter of 5.0 μm or more is $22/mm^2$, and more preferably is $25/mm^2$. Note that, although the upper limit of the surface number density of MnS-based inclusions having an equivalent circular diameter of 5.0 μm or more is not particularly limited, in the case of a steel material having the aforementioned chemical composition in which the content of each element is within the range of the present embodiment and Fn1 and Fn2 are within the range of the present embodiment, the upper limit of the surface number density of MnS-based inclusions having an equivalent circular diameter of 5.0 μm or more is, for example, $250/mm^2$, and preferably is $200/mm^2$. Note that, in the present embodiment the upper limit of the equivalent circular diameter of inclusions is not particularly limited. However, in the case of a steel material having the aforementioned chemical composition in which the content of each element is within the range of the present embodiment and Fn1 and Fn2 are within the range of the present embodiment, the upper limit of the equivalent circular diameter of MnS-based inclusions is, for example, 75 μm.

[Regarding (II)]

The crankshaft of the present embodiment includes a nitrided layer at the outer layer. The nitrided layer is formed from the surface of the steel material to a predetermined depth by nitriding. The nitrided layer includes a compound layer and a diffusion layer. The compound layer is formed in a range from the surface of the nitrided layer to a predetermined depth. The diffusion layer is formed further inward in the steel material than the compound layer. In the crankshaft, the portion that is further inward than the nitrided layer is referred to as a "core portion". Here, in the steel material before nitriding, inclusions are also present in the region where the compound layer will be formed. Therefore, naturally, inclusions also remain in the compound layer after nitriding. Among the inclusions included in the compound layer, during use of the crankshaft, oxides are liable to act as a starting point for a crack in the compound layer of the pin section and the journal section of the crankshaft. Thus, oxides cause the wear resistance of the crankshaft to decrease. Therefore, if the ratio of the total number of MnS-based inclusions with respect to the total number of inclusions in the steel material is increased, the number ratio of oxides can be reduced and the wear resistance of the pin section and the journal section of the crankshaft will increase.

Here, the ratio of the total number of MnS single inclusions and MnS composite inclusions with respect to the total number of inclusions having an equivalent circular diameter of 1.0 μm or more is defined as "MnS-based inclusions number ratio $RA_{MnS}$". Inclusions having an equivalent circular diameter of less than 1.0 μm do not significantly influence the wear resistance of a crankshaft that includes a nitrided layer (compound layer). On the other hand, inclusions having an equivalent circular diameter of 1.0 μm or more can influence the wear resistance of a crankshaft that includes a nitrided layer (compound layer). Therefore, the equivalent circular diameter of inclusions that are taken as an object of the MnS-based inclusions number ratio $RA_{MnS}$ is to be 1.0 μm or more. Note that, in the present embodiment, the upper limit of the equivalent circular diameter of inclusions is not particularly limited. However, in the case of a steel material having the aforementioned chemical composition in which the content of each element is within the range of the present embodiment and Fn1 and Fn2 are within the range of the present embodiment, the upper limit of the equivalent circular diameter of the inclusions is, for example, 75 μm.

In a steel material having the aforementioned chemical composition in which the content of each element is within the range of the present embodiment and Fn1 and Fn2 are within the range of the present embodiment, if the ratio of the total number of MnS single inclusions and MnS composite inclusions with respect to the total number of inclusions having an equivalent circular diameter of 1.0 μm or more (that is, the MnS-based inclusions number ratio $RA_{MnS}$) is 70% or more, the wear resistance of the crankshaft can be sufficiently enhanced. A preferable lower limit of the MnS-based inclusions number ratio $RA_{MnS}$ is more than 70%, further preferably is 72%, and further preferably is 73%. The upper limit of the MnS-based inclusions number ratio $RA_{MnS}$ is not particularly limited, and may be 100%.

[Regarding (III)]

In the present description, the generic term for single oxides and MnS composite oxides is defined as "oxides". In the aforementioned crankshaft, even if the number ratio of MnS-based inclusions among all inclusions is high, if the number ratio of MnS composite oxides among the oxides is low, the number ratio of single oxides among the oxides will be high. In this case, the ratio of hard single oxides that are present in the compound layer will be high. Single inclusions are liable to become a starting point for a crack in the compound layer. Therefore, among the oxides that are present in the compound layer, if the ratio of single oxides is high, the wear resistance of a crankshaft having the nitrided layer will decrease. Therefore, by also increasing the number ratio of MnS composite oxides with respect to the total number of oxides (single oxides and MnS composite oxides), and not just increasing the MnS-based inclusions number ratio $RA_{MnS}$, the wear resistance of a crankshaft having the nitrided layer will be enhanced.

The number ratio of MnS composite oxides having an equivalent circular diameter of 1.0 μm or more with respect to the total number of oxides (single oxides and MnS composite oxides) having an equivalent circular diameter of 1.0 μm or more in the steel material is defined as "MnS composite oxides number ratio $RA_{OX}$". In a steel material having the aforementioned chemical composition in which the content of each element is within the range of the present embodiment and Fn1 and Fn2 are within the range of the present embodiment, if, in addition to satisfying the above (I) and (II), the ratio of the number of MnS composite oxides having an equivalent circular diameter of 1.0 μm or more with respect to the total number of oxides (single oxides and MnS composite oxides) having an equivalent circular diameter of 1.0 μm or more in the steel material (MnS composite oxides number ratio $RA_{OX}$) is 30% or more, sufficient wear resistance will be obtained in the crankshaft. A preferable lower limit of the MnS composite oxides number ratio $RA_{OX}$ is 32.0%, more preferably is 34.0%, and further preferably is 35.0%. The upper limit of the MnS composite oxides number ratio $RA_{OX}$ is not particularly limited, and may be 100.0%. Note that, in the present embodiment, the upper limit of the equivalent circular diameter of oxides is not particularly limited. However, in the case of a steel material having the aforementioned chemical composition in which the content of each element is within the range of the present embodiment and Fn1 and Fn2 are within the range of the present embodiment, the upper limit of the equivalent circular diameter of the oxides is, for example, 75 μm.

[Method for Measuring Inclusions]

The surface number density SN, the MnS-based inclusions number ratio $RA_{MnS}$, and the MnS composite oxides number ratio $RA_{OX}$ can be determined by the following method.

The number of MnS-based inclusions (MnS single inclusions and MnS composite inclusions) and the number of oxides (single oxides and MnS composite oxides) in the steel can be measured by the following method. A sample is taken from the steel material. Specifically, as illustrated in FIG. 1, the sample is taken from an R/2 position (R represents the radius of a steel material 1) in the radial direction from a central axis C1 of a steel material 1. The size of the observation surface of the sample is not particularly limited. The observation surface of the sample is, for example, L1×L2, with L1 being 10 mm and L2 being 5 mm. A sample thickness L3 that is the thickness in a direction perpendicular to the observation surface is, for example, 5 mm. A normal N to the observation surface is to be perpendicular to the central axis C1 (that is, the observation surface is parallel to the axial direction of the steel material), and the R/2 position is to be approximately the center position of the observation surface.

The observation surface of the sample that is taken is mirror-polished, and 50 visual fields (visual field area of 125 μm×75 μm per visual field) are observed randomly at a magnification of ×2000 using a scanning electron microscope (SEM).

The inclusions in each visual field are identified. The inclusions can be identified by contrast. Each identified inclusion is identified as an MnS single inclusion, an MnS composite inclusion, a single oxide, or an MnS composite oxide using energy dispersive X-ray spectroscopy (EDX). Specifically, each inclusion in the visual field is irradiated with a beam to detect a characteristic X-ray for performing elemental analysis of the inclusion. The inclusions are identified as follows based on the results of the elemental analysis for each inclusion.

(a) When the mass percent of each inclusion is taken as 100%, if the total of a content of Mn and a content of S in percent by mass in an inclusion is 80.0% or more, the inclusion is defined as an "MnS single inclusion".

(b) When the mass percent of each inclusion is taken as 100%, if the total of a content of Mn and a content of S in percent by mass in an inclusion is 15.0 to less than 80.0%, the inclusion is defined as an "MnS composite inclusion".

(c) When the mass percent of each inclusion is taken as 100%, if the total of a content of Al, a content of Ca, and a content of O in percent by mass is 80.0% or more and the total of a content of Mn and a content of S in percent by mass is less than 15.0% in an inclusion, the inclusion is defined as a "single oxide".

(d) When the mass percent of each inclusion is taken as 100%, if the total of a content of Al, a content of Ca, and a content of O in percent by mass is 15.0 to less than 80.0% and the total of a content of Mn and a content of S in percent by mass is 15.0 to less than 80.0% in an inclusion, the inclusion is defined as an "MnS composite oxide".

The inclusions to be taken as the object of the above-described identification are inclusions having an equivalent circular diameter of 1.0 μm or more. Here, the term "equivalent circular diameter" means the diameter of a circle in a case where the area of each inclusion is converted into a circle having the same area. The equivalent circular diameter (μm) of each inclusion identified can be determined by well-known image analysis.

Here, in the present embodiment, the beam diameter of the EDX used to identify inclusions is set to about 50 nm. As a result, components of ferrite may sometimes be detected by the EDX as inclusions having an equivalent circular diameter of less than 1.0 μm, and hence sufficient accuracy in the elemental analysis may not be obtained. In addition, the influence of inclusions having an equivalent circular diameter of less than 1.0 μm on machinability and wear resistance is small. Therefore, in the present embodiment, as mentioned above, inclusions having an equivalent circular diameter of 1.0 μm or more are taken as the objects for identification.

Among the inclusions identified in the 50 visual fields, the total number of MnS single inclusions having an equivalent circular diameter of 5.0 μm or more and MnS composite inclusions having an equivalent circular diameter of 5.0 μm or more (that is, MnS-based inclusions having an equivalent circular diameter of 5.0 μm or more) is determined. The surface number density SN (/$mm^2$) of MnS-based inclusions having an equivalent circular diameter of 5.0 μm or more is then determined based on the total number of MnS-based inclusions having an equivalent circular diameter of 5.0 μm or more and the total area of the 50 visual fields. Note that, the surface number density SN is to be made a value obtained by rounding to the nearest integer.

Further, among the inclusions identified in the 50 visual fields, the total number of inclusions having an equivalent circular diameter of 1.0 μm or more is determined. In addition, among the inclusions identified in the 50 visual fields, the total number of MnS single inclusions having an equivalent circular diameter of 1.0 μm or more and MnS composite inclusions having an equivalent circular diameter of 1.0 μm or more is determined. Based on the total number of inclusions having an equivalent circular diameter of 1.0 μm or more, and the total number of MnS single inclusions having an equivalent circular diameter of 1.0 μm or more and MnS composite inclusions having an equivalent circular diameter of 1.0 μm or more, the MnS-based inclusions number ratio $RA_{MnS}$ (%) is determined by the following formula.

$RA_{MnS}$=(total number of *MnS* single inclusions having an equivalent circular diameter of 1.0 μm or more and *MnS* composite inclusions having an equivalent circular diameter of 1.0 μm or more)/(total number of inclusions having an equivalent circular diameter of 1.0 μm or more)×100

Note that, the MnS-based inclusions number ratio $RA_{MnS}$ is to be made a value obtained by rounding to the nearest integer.

Further, among the inclusions identified in the 50 visual fields, the total number of single oxides having an equivalent circular diameter of 1.0 μm or more and MnS composite oxides having an equivalent circular diameter of 1.0 μm or more is determined. In addition, among the inclusions identified in the 50 visual fields, the total number of MnS composite oxides having an equivalent circular diameter of 1.0 μm or more is determined. Based on the total number of single oxides having an equivalent circular diameter of 1.0 μm or more and MnS composite oxides having an equivalent circular diameter of 1.0 μm or more (that is, the total number of oxides having an equivalent circular diameter of 1.0 μm or more), and the total number of MnS composite oxides having an equivalent circular diameter of 1.0 μm or more, the MnS composite oxides number ratio $RA_{OX}$ (%) is determined by the following formula.

$RA_{OX}$=(total number of *MnS* composite oxides having an equivalent circular diameter of 1.0 μm or more)/(total number of oxides having an equivalent circular diameter of 1.0 μm or more)×100

Note that, the MnS composite oxides number ratio $RA_{OX}$ is to be made a value obtained by rounding to the nearest integer.

As described above, in the steel material of the present embodiment, each element is within the range of the present embodiment, and Fn1 defined by Formula (1) is 1.00 to 2.05 and Fn2 defined by Formula (2) is 0.42 to 0.60, and furthermore, the following (I) to (III) are satisfied.

(I) In the steel material, the surface number density of the total of MnS single inclusions having an equivalent circular diameter of 5.0 μm or more and MnS composite inclusions having an equivalent circular diameter of 5.0 μm or more is 20/$mm^2$ or more.

(II) In the steel material, the ratio of the total number of MnS single inclusions having an equivalent circular diameter of 1.0 μm or more and MnS composite inclusions having an equivalent circular diameter of 1.0 μm or more with respect to the total number of inclusions having an equivalent circular diameter of 1.0 μm or more is 70% or more.

(III) In the steel material, the ratio of the number of MnS composite oxides having an equivalent circular diameter of 1.0 μm or more with respect to the total number of single oxides having an equivalent circular diameter of 1.0 μm or more and MnS composite oxides having an equivalent circular diameter of 1.0 μm or more is 30% or more.

By being constituted as described above, the steel material of the present embodiment has excellent machinability, and in addition, when the steel material is subjected to nitriding and made into a crankshaft, excellent wear resistance, excellent bending fatigue strength, and an excellent bend-straightening property are obtained.

[Regarding Crankshaft]

Figure 2:
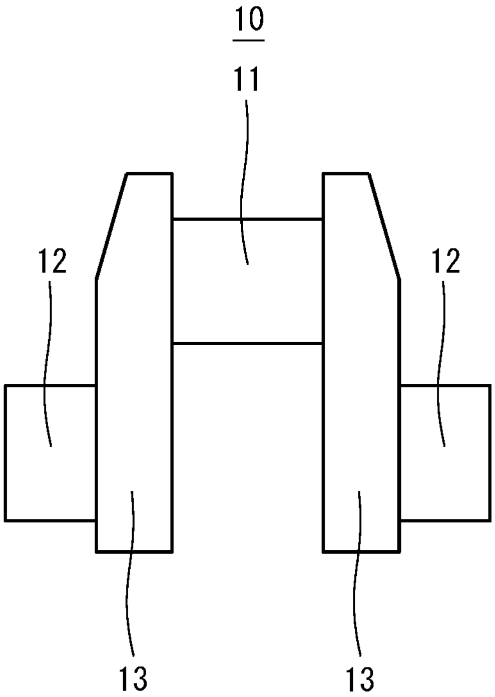
FIG. 2 is a view illustrating one example of a principal part of a crankshaft of the present embodiment.

The crankshaft of the present embodiment is produced by subjecting the steel material of the present embodiment described above to hot forging, and thereafter performing nitriding. FIG. 2 is a view illustrating one example of a principal part of the crankshaft of the present embodiment. Referring to FIG. 2, a crankshaft 10 of the present embodiment includes a pin section 11, journal sections 12, and arm sections 13. The journal sections 12 are arranged coaxially with the axis of rotation of the crankshaft 10. The pin section 11 is arranged so as to be offset from the axis of rotation of the crankshaft 10. Each arm section 13 is arranged between the pin section 11 and one of the journal sections 12, and is connected to the pin section 11 and the journal section 12. The crankshaft 10 may include an unshown fillet section at a portion of the pin section 11 that is adjacent to the arm section 13, or may include an unshown fillet section at a portion of the journal section 12 that is adjacent to the arm section 13.

Each journal section 12 is rotatably supported by an unshown bearing, and is connected to a driving source such as an engine. The pin section 11 is inserted into the large end of an unshown connecting rod. When the crankshaft 10 rotates around its axis upon receiving a driving force from the driving source, the connecting rod moves up and down. At this time, the pin section 11 and the journal sections 12 slide while receiving an external force.

Figure 3:
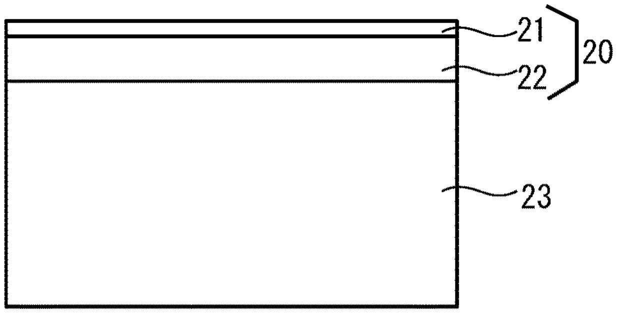
FIG. 3 is a cross-sectional view of the vicinity of the outer layer of a pin section or a journal section of the crankshaft illustrated in FIG. 2.

FIG. 3 is a cross-sectional view of the vicinity of an outer layer of the pin section 11 or the journal section 12 of the crankshaft 10 in FIG. 2. At least the pin section 11 and the journal section 12 of the crankshaft 10 include a nitrided layer 20 formed at the outer layer, and a core portion 23 that is further inward than the nitrided layer 20. The nitrided layer 20 is formed by nitriding, and includes a compound layer 21 and a diffusion layer 22. The compound layer 21 is formed at the outermost layer of the crankshaft 10, and includes an & phase that is a Fe nitride. The diffusion layer 22 is formed further inward than the compound layer, and is strengthened by dissolved N and/or nitrides such as Al nitrides, Cr nitrides, and Mo nitrides. The core portion 23 is a base metal portion that is further inward than the nitrided layer 20, and is a portion that is not affected by the nitriding.

Depending on nitriding conditions, the depth of the nitrided layer 20 can be appropriately adjusted.

[Regarding Chemical Composition of Core Portion]

The chemical composition of the core portion of the pin section and the journal section of the crankshaft is the same as the chemical composition of the steel material of the present embodiment. That is, the chemical composition of the core portion of the crankshaft consists of, in mass %, C: 0.25% to 0.35%, Si: 0.05 to 0.35%, Mn: 0.85 to 1.20%, P: 0.080% or less, S: 0.030 to 0.100%, Cr: 0.10% or less, Ti: 0.050% or less, Al: 0.050% or less, N: 0.005 to 0.024%, O: 0.0100% or less, Cu: 0 to 0.20%, Ni: 0 to 0.20%, Mo: 0 to 0.10%, Nb: 0 to 0.050%, Ca: 0 to 0.0100%, Bi: 0 to 0.30%, Te: 0 to 0.0100%, Zr: 0 to 0.0100%, and Pb: 0 to 0.09%, with the balance being Fe and impurities, and in which Fn1 defined by Formula (1) is 1.00 to 2.05, and Fn2 defined by Formula (2) is 0.42 to 0.60.

In addition, the core portion satisfies the following (I) to (III).

(I) In the core portion, a surface number density SN of MnS single inclusions having an equivalent circular diameter of 5.0 μm or more and MnS composite inclusions having an equivalent circular diameter of 5.0 μm or more is $20/mm^2$ or more.

(II) In the core portion, the ratio of the total number of MnS single inclusions having an equivalent circular diameter of 1.0 μm or more and MnS composite inclusions having an equivalent circular diameter of 1.0 μm or more with respect to the total number of inclusions having an equivalent circular diameter of 1.0 μm or more (that is, the MnS-based inclusions number ratio $RA_{MnS}$) is 70% or more.

(III) In the core portion, the ratio of the number of MnS composite oxides having an equivalent circular diameter of 1.0 μm or more with respect to the total number of oxides having an equivalent circular diameter of 1.0 μm or more (single oxides and MnS composite oxides) (that is, the MnS composite oxides number ratio $RA_{OX}$) is 30% or more.

The above conditions (I) to (III) with respect to the core portion of the pin section and journal section of the crankshaft are the same as the conditions (I) to (III) with respect to the steel material. Therefore, a preferable lower limit value of the surface number density SN, a preferable lower limit value of the MnS-based inclusions number ratio $RA_{MnS}$, and a preferable lower limit value of the MnS composite oxides number ratio $RA_{OX}$ in the core portion are the same as the preferable lower limit value of the surface number density SN, the preferable lower limit value of the MnS-based inclusions number ratio $RA_{MnS}$, and the preferable lower limit value of the MnS composite oxides number ratio $RA_{OX}$ in the steel material.

[Production Methods]

Hereunder, an example of a method for producing the steel material of the present embodiment and an example of a method for producing the crankshaft of the present embodiment are described. Note that, as long as the steel material and the crankshaft of the present embodiment are constituted as described above, the production methods are not limited to the production methods described hereunder. However, the production methods described hereunder are preferred examples for producing the steel material and the crankshaft of the present embodiment.

First, an example of a method for producing the steel material of the present embodiment will be described. One example of a method for producing the steel material includes a steelmaking process and a hot working process. Hereunder, each process is described.

[Steelmaking Process]

The steelmaking process includes a refining process and a continuous casting process.

[Refining Process]

In the refining process, primary refining is performed using a converter, and thereafter secondary refining is performed using an LF (ladle furnace) and an RH (Ruhrstahl-Hausen) process.

[Primary Refining]

In the refining process, first, molten iron produced by a well-known method is subjected to a well-known molten iron preparation treatment to perform a desulfurization treatment, a desiliconization treatment, and a dephosphorization treatment. The molten iron that underwent the desulfurization treatment, desiliconization treatment and dephosphorization treatment is then subjected to refining (primary refining) using a converter to produce molten steel. The components of the molten steel may be adjusted by adding alloying elements to the molten steel during the primary refining or after the primary refining.

[Secondary Refining]

The molten steel after the primary refining is subjected to secondary refining. In the secondary refining, refining in an LF is performed, and next a RH vacuum degassing treatment is performed to make the morphology of inclusions in the steel material satisfy (I) to (III).

[Refining in LF]

In the secondary refining, first, a desulfurization treatment is performed in an LF, and in addition, inclusions in the molten steel are removed. The refining in the LF is carried out in a manner so that the following conditions are satisfied.

(i) The oxygen content in the molten steel during refining in the LF is to be 40 ppm or less.

(ii) The molten steel temperature during refining in the LF is to be 1550° C. or more.

[Regarding Condition (i)]

The oxygen content in the molten steel and the molten steel temperature during refining in the LF influence the morphology of MnS-based inclusions. If the oxygen content in the molten steel during refining in the LF is more than 40 ppm, even if the molten steel temperature is 1550° C. or more, coarse lump-like MnS-based inclusions will crystallize. In such a case, the lump-like MnS-based inclusions will float to the surface and be absorbed by slag, and the number of MnS-based inclusions (MnS single inclusions and MnS composite inclusions) in the steel material as a product will decrease. Alternatively, MnS-based inclusions with a coarse morphology will remain in the steel, and consequently the number of MnS-based inclusions in the steel material as a product will decrease. As a result, the surface number density SN of MnS-based inclusions having an equivalent circular diameter of 5.0 μm or more in the steel material will be less than $20/mm^2$.

[Regarding Condition (ii)]

Similarly, if the molten steel temperature during refining in the LF is less than 1550° C., even if the oxygen content in the molten steel is 40 ppm or less, coarse lump-like MnS-based inclusions will crystallize. In such a case, the lump-like MnS-based inclusions will float to the surface and be absorbed by slag, or MnS-based inclusions with a coarse morphology will remain in the steel, and consequently the number of MnS-based inclusions in the steel material as a product will decrease. As a result, the surface number density SN of MnS-based inclusions having an equivalent circular diameter of 5.0 μm or more in the steel material will be less than $20/mm^2$.

By adjusting the oxygen content of the molten steel during refining in the LF to 40 ppm or less, and adjusting the molten steel temperature during refining in the LF to 1550° C. or more, crystallization of MnS-based inclusions during refining in the LF is suppressed. Note that, during the refining in the LF, alloying elements may be added to the molten steel to adjust the composition of the molten steel.

[RH Vacuum Degassing Treatment]

After the refining in the LF, a RH (Ruhrstahl-Hausen) vacuum degassing treatment is performed to carry out degassing (removal of N and H in the molten steel) and the separation and removal of inclusions. In the RH vacuum degassing treatment, as necessary, alloying elements are added to the molten steel to adjust the composition. The RH vacuum degassing treatment is carried out in a manner so that the following conditions (iii) to (v) are satisfied.

(iii) The molten steel temperature during the RH vacuum degassing treatment is to be 1550° C. or more.

(iv) The amount of dissolved oxygen in the molten steel five minutes before the end of the RH vacuum degassing treatment is to be within the range of 40 to 120 ppm.

(v) Before the end of the RH vacuum degassing treatment, Al is to be added to the molten steel to carry out a deoxidation treatment, and the treatment time of the deoxidation treatment by addition of Al is to be within five minutes.

[Regarding Condition (iii)]

If the molten steel temperature during the RH vacuum degassing treatment is less than 1550° C., even if the oxygen content in the molten steel is 40 to 120 ppm, coarse lump-like MnS-based inclusions will crystallize. In such a case, the lump-like MnS-based inclusions will float to the surface and be absorbed by slag, or MnS-based inclusions with a coarse morphology will remain in the steel, and consequently the number of MnS-based inclusions in the steel material as a product will decrease. As a result, the surface number density SN of MnS-based inclusions having an equivalent circular diameter of 5.0 μm or more in the steel material will be less than $20/mm^2$.

[Regarding Condition (iv)]

If the amount of dissolved oxygen in the molten steel five minutes before the end of the RH vacuum degassing treatment is less than 40 ppm, a large amount of MnS for which oxides do not act as formation nuclei will form, and the amount of MnS composite oxides which are formed will decrease. Consequently, in the steel material, the ratio of the number of MnS composite oxides having an equivalent circular diameter of 1.0 μm or more with respect to the total number of oxides having an equivalent circular diameter of 1.0 μm or more (single oxides and MnS composite oxides) (that is, the MnS composite oxides number ratio $RA_{OX}$) will be less than 30%.

On the other hand, if the amount of dissolved oxygen in the molten steel five minutes before the end of the RH vacuum degassing treatment is more than 120 ppm, coarse MnS-based inclusions will form. In such a case, because such coarse MnS-based inclusions form in the steel material, the number of MnS-based inclusions will decrease. As a result, the surface number density SN of MnS-based inclusions having an equivalent circular diameter of 5.0 μm or more in the steel material will be less than $20/mm^2$. Further, in the steel material that is the product, the ratio of the total number of MnS single inclusions having an equivalent circular diameter of 1.0 μm or more and MnS composite inclusions having an equivalent circular diameter of 1.0 μm or more with respect to the total number of inclusions having an equivalent circular diameter of 1.0 μm or more (that is, the MnS-based inclusions number ratio $RA_{MnS}$) will be less than 70.0%.

[Regarding Condition (v)]

In a case where the treatment time for the deoxidation treatment by Al addition before the end of the RH vacuum degassing treatment is more than five minutes, a large number of coarse single oxides will form in the molten steel. In such a case, in the casting process, coarse single oxides will not function as formation nuclei for MnS-based inclusions. As a result, MnS single inclusions that do not combine with single oxides will form, and formation of MnS composite oxides will be suppressed. Consequently, in the steel material that is the product, the ratio of the number of MnS composite oxides having an equivalent circular diameter of 1.0 μm or more with respect to the total number of oxides having an equivalent circular diameter of 1.0 μm or more (that is, the MnS composite oxides number ratio $RA_{OX}$) will be less than 30%.

If the molten steel temperature during the RH vacuum degassing treatment is adjusted to 1550° C. or more, the amount of dissolved oxygen in the molten steel in the RH vacuum degassing treatment is adjusted so that the amount of dissolved oxygen in the molten steel five minutes before the end of the RH vacuum degassing treatment becomes 40 to 120 ppm, and the treatment time of the deoxidation treatment by Al addition that is performed before the end of the RH vacuum degassing treatment is five minutes or less, in the molten steel before a casting process that is the next process, formation of coarse MnS-based inclusions can be suppressed and a large number of fine oxides that function as nuclei for MnS formation in the casting process that is the next process can be formed.

[Continuous Casting Process]

In the continuous casting process, the molten steel after the aforementioned refining process is used to produce a bloom by a continuous casting method. In the continuous casting process, casting is performed according to the following condition.

(vi) The casting speed from the start of continuous casting until the end of continuous casting is to be 0.6 to 1.0 m/min.

[Regarding Condition (vi)]

If the casting speed in the continuous casting process is less than 0.6 m/min, the casting speed will be too slow. In this case, at the solidification stage, although MnS-based inclusions will form, the MnS-based inclusions will coarsen and, as a result, the number of MnS-based inclusions will decrease. Consequently, in the steel material that is the product, the ratio of the total number of MnS single inclusions having an equivalent circular diameter of 1.0 μm or more and MnS composite inclusions having an equivalent circular diameter of 1.0 μm or more with respect to the total number of inclusions having an equivalent circular diameter of 1.0 μm or more (that is, the MnS-based inclusions number ratio $RA_{MnS}$) will be less than 70%.

On the other hand, if the casting speed in the continuous casting process is more than 1.0 m/min, the casting speed will be too fast and consequently MnS-based inclusions will form in the concentrated molten steel. At such time, MnS will not combine with single oxides, and will be formed as MnS single inclusions. As a result, the ratio of the number of MnS composite oxides having an equivalent circular diameter of 1.0 μm or more with respect to the total number of oxides having an equivalent circular diameter of 1.0 μm or more (that is, the MnS composite oxides number ratio $RA_{OX}$) in the steel material that is the product will be less than 30%.

A bloom including inclusions satisfying the aforementioned conditions (I) to (III) is produced by the above refining process and casting process.

[Hot Working Process]

In the hot working process, the bloom produced by the continuous casting process is subjected to hot working to produce a steel material. The shape of the steel material is the shape of a steel bar.

The hot working process includes a rough rolling process and a finish rolling process. In the rough rolling process, the starting material is subjected to hot working to produce a billet. The rough rolling process is performed, for example, using a blooming mill. The bloom is subjected to blooming using the blooming mill to produce a billet. In a case where a continuous mill is installed downstream of the blooming mill, the billet produced by the blooming may be further subjected to hot rolling using the continuous mill to produce a billet having a smaller size. In the continuous mill, horizontal stands each of which has a pair of horizontal rolls and vertical stands each of which has a pair of vertical rolls are arranged alternately in a row. Through the above process, in the rough rolling process, a billet is produced from the bloom. The heating temperature in a reheating furnace in the rough rolling process is not particularly limited, and for example is 1100 to 1300° C.

In the finish rolling process, first, the billet is heated using a reheating furnace. The heated billet is then subjected to hot rolling using a continuous mill to produce a steel bar that is the steel material. Although not particularly limited, the heating temperature in the reheating furnace in the finish rolling process is, for example, 1000 to 1250° C. Further, in the finish rolling, the steel material temperature on the delivery side of a roll stand with which final rolling is performed is defined as "finishing temperature". At such time, the finishing temperature is, for example, 900 to 1150° C. The finishing temperature is measured with a thermometer installed on the delivery side of the roll stand with which final rolling is performed. The steel material after finish rolling is subjected to cooling at a cooling rate which is not more than that of allowing cooling to thereby produce the steel material of the present embodiment.

Note that, in the production method described above, in the hot working process, a rough rolling process and a finish rolling process are performed to produce the steel material. However, the finish rolling process in the hot working process may be omitted. Further, in the production method described above, the hot working process may be omitted. Even when these production methods are adopted, the steel material of the present embodiment which has a chemical composition in which the content of each element of the chemical composition described above is within the range of the present embodiment, Fn1 and Fn2 are within the range of the present embodiment, and which satisfies the aforementioned (I) to (III) can be produced.

[Method for Producing Crankshaft]

Next, one example of a method for producing the crankshaft of the present embodiment using the steel material of the present embodiment will be described.

One example of a method for producing the crankshaft of the present embodiment includes a hot forging process, a cutting process, and a nitriding process.

[Hot Forging Process]

The steel material of the present embodiment that is described above is subjected to hot forging to produce an intermediate product having the shape of a crankshaft. The heating temperature of the steel material before hot forging is, for example, 1100 to 1350° C. The term "heating temperature" used here means the furnace temperature (° C.) of the reheating furnace. Although the holding time at the heating temperature is not particularly limited, the steel material is held until the temperature of the steel material becomes equal to the furnace temperature. The finishing temperature of the hot forging is, for example, 1000 to 1300° C.

The intermediate product after hot forging is cooled by a well-known method. The cooling method is, for example, allowing the intermediate product to cool. As necessary, the intermediate product after cooling is subjected to a blasting treatment such as shotblasting to remove oxide scale that formed during the hot forging.

[Cutting Process]

The intermediate product after the hot forging process is subjected to cutting. By performing cutting, the intermediate product is made a shape that is closer to the product shape.

[Nitriding Process]

The intermediate product after the cutting process is subjected to nitriding. In the present embodiment, well-known nitriding is used. The nitriding is, for example, gas nitriding, salt bath nitriding, or ion nitriding. The furnace atmosphere during nitriding may be $NH_3$ only, or may be a gaseous mixture containing $NH_3$ and also $N_2$ and/or $H_2$. Further, these gases may contain a gas having carburizing properties to carry out a nitrocarburizing treatment. That is, as used in the present description, the term "nitriding" includes a nitrocarburizing treatment.

In the case of performing a gas nitrocarburizing treatment, for example, an atmosphere in which an endothermic converted gas (RX gas) and ammonia gas are mixed at a ratio of 1:1 is used, the nitriding temperature is set to 500 to 650° C., and the holding time at the nitriding temperature is set to 0.5 to 8.0 hours. The intermediate product after nitriding is rapidly cooled. The rapid cooling method is water cooling or oil cooling. The nitriding conditions are not limited to the conditions described above, and may be appropriately adjusted so that the nitrided layer has a desired depth.

A crankshaft in which a nitrided layer is formed at the outer layer is produced by the above nitriding process.

EXAMPLES

Hereunder, the advantageous effects of the steel material and the crankshaft of the present embodiment are described more specifically by way of Examples (First Example and Second Example). The conditions adopted in the following examples are one example of conditions employed for confirming the workability and advantageous effects of the steel material and the crankshaft of the present embodiment. Accordingly, the steel material and the crankshaft of the present embodiment are not limited to this one example of conditions.

First Example

[Production of Test Material]

Molten steels having the chemical compositions shown in Table 1 and Table 2 were melted in a 70-ton converter.

TABLE 1

| Test | Chemical Composition (in mass %; balance is Fe and impurities) | | | | | | | | | | | | |
|---|---|---|---|---|---|---|---|---|---|---|---|---|---|
| No. | C | Si | Mn | P | S | Cr | Ti | Al | N | O | Other | Fn1 | Fn2 |
| 1 | 0.30 | 0.15 | 1.01 | 0.015 | 0.055 | 0.05 | 0.015 | 0.010 | 0.015 | 0.0032 | — | 1.44 | 0.50 |
| 2 | 0.35 | 0.29 | 1.04 | 0.022 | 0.068 | 0.03 | 0.019 | 0.003 | 0.017 | 0.0040 | — | 1.28 | 0.56 |
| 3 | 0.25 | 0.17 | 0.98 | 0.025 | 0.056 | 0.06 | 0.008 | 0.009 | 0.014 | 0.0034 | — | 1.47 | 0.45 |
| 4 | 0.34 | 0.17 | 1.17 | 0.008 | 0.049 | 0.05 | 0.016 | 0.012 | 0.014 | 0.0016 | — | 1.61 | 0.57 |
| 5 | 0.26 | 0.24 | 0.92 | 0.019 | 0.058 | 0.05 | 0.023 | 0.015 | 0.016 | 0.0036 | — | 1.38 | 0.45 |
| 6 | 0.30 | 0.34 | 1.10 | 0.024 | 0.074 | 0.06 | 0.012 | 0.003 | 0.014 | 0.0040 | — | 1.55 | 0.53 |
| 7 | 0.32 | 0.06 | 1.10 | 0.009 | 0.072 | 0.04 | 0.012 | 0.024 | 0.012 | 0.0034 | — | 1.55 | 0.52 |
| 8 | 0.33 | 0.30 | 1.06 | 0.016 | 0.073 | 0.05 | 0.021 | 0.021 | 0.018 | 0.0028 | — | 1.56 | 0.55 |
| 9 | 0.33 | 0.11 | 0.98 | 0.010 | 0.058 | 0.07 | 0.009 | 0.028 | 0.012 | 0.0011 | — | 1.67 | 0.52 |
| 10 | 0.29 | 0.16 | 1.20 | 0.012 | 0.066 | 0.05 | 0.007 | 0.024 | 0.016 | 0.0034 | — | 1.72 | 0.52 |
| 11 | 0.29 | 0.18 | 0.85 | 0.016 | 0.074 | 0.07 | 0.014 | 0.018 | 0.018 | 0.0016 | — | 1.47 | 0.46 |
| 12 | 0.32 | 0.13 | 0.91 | 0.016 | 0.053 | 0.03 | 0.018 | 0.008 | 0.013 | 0.0008 | — | 1.18 | 0.49 |
| 13 | 0.32 | 0.24 | 0.95 | 0.008 | 0.099 | 0.05 | 0.018 | 0.025 | 0.017 | 0.0008 | — | 1.48 | 0.50 |
| 14 | 0.32 | 0.24 | 1.10 | 0.016 | 0.032 | 0.05 | 0.017 | 0.003 | 0.016 | 0.0015 | — | 1.48 | 0.55 |
| 15 | 0.31 | 0.14 | 0.93 | 0.019 | 0.036 | 0.04 | 0.009 | 0.016 | 0.018 | 0.0045 | — | 1.32 | 0.50 |
| 16 | 0.33 | 0.24 | 1.13 | 0.014 | 0.040 | 0.05 | 0.023 | 0.029 | 0.016 | 0.0034 | — | 1.68 | 0.57 |
| 17 | 0.33 | 0.24 | 1.19 | 0.012 | 0.064 | 0.05 | 0.011 | 0.049 | 0.018 | 0.0046 | — | 1.87 | 0.57 |
| 18 | 0.29 | 0.24 | 1.09 | 0.015 | 0.074 | 0.04 | 0.025 | 0.040 | 0.018 | 0.0005 | — | 1.64 | 0.51 |
| 19 | 0.29 | 0.19 | 0.93 | 0.022 | 0.064 | 0.03 | 0.018 | 0.001 | 0.015 | 0.0038 | — | 1.15 | 0.47 |
| 20 | 0.33 | 0.20 | 0.96 | 0.013 | 0.072 | 0.04 | 0.018 | 0.036 | 0.013 | 0.0032 | — | 1.48 | 0.52 |
| 21 | 0.28 | 0.16 | 1.09 | 0.008 | 0.065 | 0.06 | 0.015 | 0.002 | 0.014 | 0.0009 | — | 1.54 | 0.49 |
| 22 | 0.27 | 0.19 | 1.17 | 0.013 | 0.046 | 0.07 | 0.048 | 0.019 | 0.012 | 0.0038 | — | 1.80 | 0.51 |
| 23 | 0.32 | 0.15 | 1.13 | 0.017 | 0.074 | 0.06 | 0.039 | 0.017 | 0.018 | 0.0033 | — | 1.68 | 0.54 |
| 24 | 0.28 | 0.13 | 1.03 | 0.024 | 0.046 | 0.04 | 0.001 | 0.026 | 0.014 | 0.0031 | — | 1.49 | 0.48 |
| 25 | 0.28 | 0.20 | 1.10 | 0.011 | 0.063 | 0.06 | 0.008 | 0.022 | 0.016 | 0.0031 | — | 1.68 | 0.50 |
| 26 | 0.32 | 0.22 | 1.02 | 0.012 | 0.062 | 0.06 | 0.012 | 0.019 | 0.018 | 0.0027 | — | 1.58 | 0.53 |
| 27 | 0.29 | 0.13 | 1.09 | 0.009 | 0.063 | 0.04 | 0.015 | 0.022 | 0.024 | 0.0019 | — | 1.52 | 0.50 |
| 28 | 0.27 | 0.15 | 1.03 | 0.024 | 0.063 | 0.07 | 0.024 | 0.023 | 0.006 | 0.0037 | — | 1.69 | 0.48 |
| 29 | 0.27 | 0.17 | 1.13 | 0.009 | 0.048 | 0.07 | 0.016 | 0.010 | 0.022 | 0.0009 | — | 1.70 | 0.50 |
| 30 | 0.30 | 0.15 | 1.11 | 0.019 | 0.070 | 0.07 | 0.020 | 0.004 | 0.008 | 0.0025 | — | 1.64 | 0.52 |
| 31 | 0.30 | 0.26 | 1.09 | 0.010 | 0.045 | 0.04 | 0.018 | 0.004 | 0.019 | 0.0034 | — | 1.41 | 0.53 |
| 32 | 0.31 | 0.22 | 1.17 | 0.014 | 0.068 | 0.04 | 0.016 | 0.008 | 0.010 | 0.0046 | — | 1.51 | 0.54 |
| 33 | 0.31 | 0.24 | 1.05 | 0.079 | 0.066 | 0.06 | 0.019 | 0.005 | 0.016 | 0.0013 | — | 1.52 | 0.52 |
| 34 | 0.31 | 0.17 | 0.93 | 0.048 | 0.050 | 0.07 | 0.014 | 0.017 | 0.017 | 0.0014 | — | 1.55 | 0.50 |
| 35 | 0.31 | 0.20 | 0.96 | 0.030 | 0.047 | 0.06 | 0.016 | 0.006 | 0.012 | 0.0015 | — | 1.43 | 0.51 |
| 36 | 0.32 | 0.20 | 1.00 | 0.009 | 0.055 | 0.10 | 0.022 | 0.011 | 0.012 | 0.0040 | — | 1.80 | 0.53 |
| 37 | 0.27 | 0.25 | 1.04 | 0.017 | 0.065 | 0.09 | 0.010 | 0.016 | 0.012 | 0.0005 | — | 1.80 | 0.49 |
| 38 | 0.30 | 0.14 | 0.93 | 0.007 | 0.057 | 0.08 | 0.008 | 0.003 | 0.018 | 0.0019 | — | 1.53 | 0.49 |
| 39 | 0.33 | 0.14 | 1.19 | 0.008 | 0.054 | 0.07 | 0.007 | 0.008 | 0.016 | 0.0098 | — | 1.75 | 0.57 |
| 40 | 0.30 | 0.15 | 0.97 | 0.016 | 0.052 | 0.06 | 0.016 | 0.011 | 0.018 | 0.0079 | — | 1.48 | 0.50 |
| 41 | 0.28 | 0.26 | 0.97 | 0.020 | 0.060 | 0.04 | 0.011 | 0.010 | 0.015 | 0.0048 | — | 1.32 | 0.48 |
| 42 | 0.28 | 0.19 | 1.19 | 0.021 | 0.055 | 0.09 | 0.017 | 0.030 | 0.012 | 0.0014 | — | 2.04 | 0.53 |
| 43 | 0.28 | 0.20 | 0.90 | 0.008 | 0.056 | 0.01 | 0.008 | 0.004 | 0.018 | 0.0024 | — | 1.00 | 0.45 |
| 44 | 0.28 | 0.21 | 1.15 | 0.016 | 0.059 | 0.09 | 0.014 | 0.029 | 0.015 | 0.0039 | — | 1.99 | 0.52 |
| 45 | 0.31 | 0.14 | 0.93 | 0.010 | 0.057 | 0.01 | 0.010 | 0.004 | 0.014 | 0.0016 | — | 1.03 | 0.48 |
| 46 | 0.34 | 0.28 | 1.18 | 0.017 | 0.065 | 0.07 | 0.023 | 0.015 | 0.013 | 0.0025 | — | 1.78 | 0.59 |
| 47 | 0.26 | 0.11 | 0.92 | 0.020 | 0.078 | 0.01 | 0.021 | 0.029 | 0.013 | 0.0032 | — | 1.18 | 0.42 |
| 48 | 0.29 | 0.17 | 1.15 | 0.016 | 0.073 | 0.05 | 0.012 | 0.009 | 0.014 | 0.0024 | — | 1.57 | 0.51 |
| 49 | 0.26 | 0.25 | 0.98 | 0.021 | 0.075 | 0.02 | 0.022 | 0.014 | 0.012 | 0.0016 | — | 1.22 | 0.45 |
| 50 | 0.31 | 0.13 | 0.94 | 0.023 | 0.075 | 0.05 | 0.007 | 0.007 | 0.013 | 0.0025 | 0.20Cu, 0.20Ni | 1.35 | 0.49 |
| 51 | 0.29 | 0.18 | 1.20 | 0.020 | 0.069 | 0.03 | 0.016 | 0.016 | 0.015 | 0.0011 | 0.08Mo | 1.52 | 0.52 |
| 52 | 0.30 | 0.26 | 1.07 | 0.013 | 0.067 | 0.06 | 0.025 | 0.015 | 0.016 | 0.0023 | 0.029Nb | 1.60 | 0.52 |
| 53 | 0.31 | 0.14 | 1.17 | 0.011 | 0.054 | 0.03 | 0.016 | 0.017 | 0.012 | 0.0031 | 0.05Pb | 1.50 | 0.53 |
| 54 | 0.31 | 0.15 | 1.11 | 0.020 | 0.062 | 0.05 | 0.017 | 0.030 | 0.015 | 0.0038 | 0.0038Zr | 1.67 | 0.53 |
| 55 | 0.28 | 0.23 | 1.00 | 0.024 | 0.044 | 0.05 | 0.020 | 0.024 | 0.016 | 0.0006 | 0.0052Te | 1.52 | 0.49 |
| 56 | 0.33 | 0.25 | 1.04 | 0.023 | 0.072 | 0.05 | 0.025 | 0.003 | 0.015 | 0.0035 | 0.0035Ca | 1.42 | 0.54 |
| 57 | 0.29 | 0.19 | 1.08 | 0.024 | 0.067 | 0.07 | 0.017 | 0.012 | 0.014 | 0.0016 | 0.10Bi | 1.67 | 0.51 |
| 58 | 0.29 | 0.31 | 1.01 | 0.015 | 0.055 | 0.05 | 0.018 | 0.015 | 0.016 | 0.0032 | 0.048Nb | 1.47 | 0.51 |
| 59 | 0.30 | 0.22 | 1.02 | 0.014 | 0.063 | 0.04 | 0.017 | 0.012 | 0.012 | 0.0022 | 0.09Pb | 1.39 | 0.50 |
| 60 | 0.31 | 0.25 | 1.05 | 0.022 | 0.055 | 0.02 | 0.016 | 0.016 | 0.015 | 0.0019 | 0.0098Zr | 1.30 | 0.52 |
| 61 | 0.28 | 0.13 | 0.99 | 0.021 | 0.054 | 0.03 | 0.019 | 0.014 | 0.016 | 0.0024 | 0.0094Te | 1.30 | 0.47 |
| 62 | 0.33 | 0.15 | 1.11 | 0.019 | 0.052 | 0.05 | 0.018 | 0.022 | 0.015 | 0.0031 | 0.0095Ca | 1.62 | 0.55 |
| 63 | 0.29 | 0.22 | 1.10 | 0.018 | 0.061 | 0.04 | 0.017 | 0.008 | 0.014 | 0.0026 | 0.27Bi | 1.44 | 0.51 |

TABLE 2

| Test | Chemical Composition (in mass %; balance is Fe and impurities) | | | | | | | | | | | |
|---|---|---|---|---|---|---|---|---|---|---|---|---|
| No. | C | Si | Mn | P | S | Cr | Ti | Al | N | O | Other | Fn1 | Fn2 |
| 64 | 0.36 | 0.20 | 1.05 | 0.023 | 0.074 | 0.04 | 0.027 | 0.009 | 0.012 | 0.0016 | — | 1.40 | 0.56 |
| 65 | 0.24 | 0.22 | 1.08 | 0.013 | 0.064 | 0.06 | 0.016 | 0.009 | 0.017 | 0.0020 | — | 1.57 | 0.46 |
| 66 | 0.32 | 0.37 | 1.11 | 0.021 | 0.085 | 0.03 | 0.015 | 0.003 | 0.010 | 0.0018 | — | 1.35 | 0.55 |
| 67 | 0.33 | 0.04 | 1.08 | 0.014 | 0.051 | 0.03 | 0.013 | 0.016 | 0.016 | 0.0026 | — | 1.40 | 0.53 |
| 68 | 0.28 | 0.23 | 1.21 | 0.028 | 0.045 | 0.08 | 0.016 | 0.007 | 0.018 | 0.0023 | — | 1.83 | 0.54 |
| 69 | 0.34 | 0.24 | 0.83 | 0.015 | 0.041 | 0.02 | 0.011 | 0.010 | 0.011 | 0.0022 | — | 1.04 | 0.51 |
| 70 | 0.33 | 0.28 | 1.09 | 0.082 | 0.074 | 0.04 | 0.022 | 0.023 | 0.011 | 0.0045 | — | 1.53 | 0.55 |
| 71 | 0.29 | 0.22 | 1.16 | 0.014 | 0.028 | 0.02 | 0.009 | 0.015 | 0.010 | 0.0045 | — | 1.40 | 0.53 |
| 72 | 0.31 | 0.12 | 1.02 | 0.023 | 0.043 | 0.11 | 0.022 | 0.009 | 0.014 | 0.0012 | — | 1.88 | 0.53 |
| 73 | 0.34 | 0.20 | 1.20 | 0.010 | 0.041 | 0.03 | 0.051 | 0.024 | 0.016 | 0.0015 | — | 1.57 | 0.58 |
| 74 | 0.27 | 0.10 | 1.02 | 0.024 | 0.076 | 0.05 | 0.024 | 0.051 | 0.013 | 0.0030 | — | 1.72 | 0.46 |
| 75 | 0.33 | 0.30 | 1.05 | 0.011 | 0.062 | 0.03 | 0.014 | 0.006 | 0.004 | 0.0023 | — | 1.31 | 0.55 |
| 76 | 0.32 | 0.15 | 1.08 | 0.025 | 0.054 | 0.07 | 0.016 | 0.015 | 0.015 | 0.0105 | — | 1.68 | 0.54 |
| 77 | 0.28 | 0.22 | 1.20 | 0.025 | 0.058 | 0.09 | 0.025 | 0.034 | 0.015 | 0.0039 | — | 2.07 | 0.53 |
| 78 | 0.34 | 0.14 | 0.90 | 0.027 | 0.055 | 0.01 | 0.007 | 0.001 | 0.010 | 0.0022 | — | 0.98 | 0.51 |
| 79 | 0.34 | 0.30 | 1.20 | 0.013 | 0.040 | 0.09 | 0.023 | 0.009 | 0.013 | 0.0034 | — | 1.91 | 0.61 |
| 80 | 0.26 | 0.08 | 0.87 | 0.021 | 0.095 | 0.02 | 0.024 | 0.013 | 0.010 | 0.0037 | — | 1.10 | 0.41 |
| 81 | 0.26 | 0.28 | 0.93 | 0.011 | 0.050 | 0.02 | 0.016 | 0.002 | 0.018 | 0.0022 | — | 1.09 | 0.45 |
| 82 | 0.27 | 0.27 | 1.08 | 0.026 | 0.064 | 0.05 | 0.014 | 0.012 | 0.017 | 0.0045 | — | 1.52 | 0.49 |
| 83 | 0.35 | 0.15 | 0.99 | 0.017 | 0.072 | 0.08 | 0.024 | 0.027 | 0.012 | 0.0035 | — | 1.75 | 0.55 |

The contents of optional elements are shown in the column "Other" in Table 1. For example, in a case where "0.20 Cu" is described, it means that the content of Cu was 0.20%. In a case where the symbol "-" is described, it means that the contents of optional elements were less than the detection limit and that an optional element was not contained. After the molten steel was subjected to primary refining, secondary refining was performed. In the secondary refining, first, refining in an LF was performed. The molten steel temperature during refining in the LF is shown in the column "Molten Steel Temperature (° C.)" in the column "LF" in Table 3, and the oxygen content of the molten steel during refining in the LF is shown in the column "Dissolved Oxygen Amount (ppm)" in the column "LF" in Table 3.

TABLE 3

| | LF | | RH | | | Continuous |
|---|---|---|---|---|---|---|
| Test No. | Molten Steel Temperature (° C.) | Dissolved Oxygen Amount (ppm) | Molten Steel Temperature (° C) | Dissolved Oxygen Amount (ppm) | Al Deoxidation Time (mins) | Casting Casting Speed (m/min) |
| 1-80 | 1580-1610 | 10-40 | 1570-1600 | 40-70 | 3 | 0.7-0.9 |
| 81 | 1580-1610 | More than 40-70 | 1570-1600 | 40-70 | 4 | 0.7-0.9 |
| 82 | 1580-1610 | 10-40 | 1570-1600 | 40-70 | 4 | 0.4-less than 0.6 |
| 83 | 1580-1610 | 10-40 | 1550-less than 1570 | 10-less than 40 | 5 | 0.7-0.9 |

After the refining in the LF, a RH vacuum degassing treatment was performed. The molten steel temperature during the RH vacuum degassing treatment is shown in the column "Molten Steel Temperature (° C.)" in the column "RH" in Table 3. The amount of dissolved oxygen in the molten steel five minutes before the end of the RH vacuum degassing treatment is shown in the column "Dissolved Oxygen Amount (ppm)" in the column "RH" in Table 3. The treatment time of deoxidation treatment by addition of Al before the end of the RH vacuum degassing treatment is shown in the column "Al Deoxidation Time (mins)" in the column "RH" in Table 3. In the column "Molten Steel Temperature (° C.)" in the column "LF", "X1-X2" means that the molten steel temperature during refining in the LF fluctuated within the range of X1 to X2° C. In the column "Dissolved Oxygen Amount (ppm)" in the column "LF", "X3-X4" means that the oxygen content of the molten steel during refining in the LF fluctuated within the range of X3 to X4 ppm. In the column "Molten Steel Temperature (° C.)" in the column "RH", "X5-X6" means that the molten steel temperature during the RH vacuum degassing treatment fluctuated within the range of X5 to X6° C. In the column "Dissolved Oxygen Amount (ppm)" in the column "RH", "X7-X8" means that the amount of dissolved oxygen in the molten steel five minutes before the end of the RH vacuum degassing treatment fluctuated within the range of X7 to X8 ppm. In the column "Al Deoxidation Time (mins)" in the column "RH", "X9" means that the treatment time of the deoxidation treatment by addition of Al before the end of the RH vacuum degassing treatment was X9 minutes.

The molten steel after the secondary refining was used to produce a bloom by a continuous casting method. The casting speed from the start until the end of the continuous casting is shown in the column "Casting Speed (m/min)" in the column "Continuous Casting" in Table 3. In the column "Casting Speed (m/min)" in the column "Continuous Casting", "X10-X11" means that the casting speed from the start until the end of the continuous casting fluctuated within the range of X10 to X11 m/min.

The produced bloom was subjected to a rough rolling process to produce a billet having a rectangular shape in which a cross section perpendicular to the longitudinal direction was 180 mm×180 mm. For each test number, the heating temperature in the rough rolling process was in the range of 1200 to 1260° C. A finish rolling process was performed using the produced billet, and then the billet that had undergone the finish rolling process was allowed to cool in the atmosphere to thereby produce a steel material that was a steel bar having a diameter of 80 mm. The heating temperature in the finish rolling process was 1050 to 1200° C., and the finishing temperature was 900 to 1150° C. A steel material to serve as the starting material for a crankshaft was produced by the above production process. The steel material of each test number was subjected to the following evaluation tests.

[Evaluation Tests]

[Inclusions Measurement Test]

The surface number density SN, the MnS-based inclusions number ratio $RA_{MnS}$, and the MnS composite oxides number ratio $RA_{OX}$ of the steel material of each test number were determined by the following methods.

A sample was taken from the steel material of each test number. Specifically, as illustrated in FIG. 1, the sample was taken from an R/2 position (R represents the radius of the steel material) in the radial direction from a central axis C1 of a steel material 1. The size of the observation surface of the sample was L1×L2, with L1 being 10 mm and L2 being 5 mm, and a sample thickness L3 that was the thickness in a direction perpendicular to the observation surface was 5 mm. A normal N to the observation surface was made perpendicular to the central axis C1 (that is, the observation surface was parallel to the axial direction of the steel material), and the R/2 position was set at approximately the center position of the observation surface.

The observation surface of the taken sample was mirror-polished, and 50 visual fields (visual field area of 125 μm×75 μm per visual field) were observed randomly at a magnification of ×2000 using a scanning electron microscope (SEM).

In each visual field, inclusions were identified based on contrast. Next, MnS single inclusions, MnS composite inclusions, and MnS composite oxides among the identified inclusions were identified using energy dispersive X-ray spectroscopy (EDX). Specifically, each inclusion in the respective visual fields was irradiated with a beam to detect characteristic X-rays for performing elemental analysis of the inclusion. The inclusions were identified as follows based on the results of the elemental analysis for each inclusion.

(a) If the total of a content of Mn and a content of S in percent by mass in an inclusion was 80.0% or more, the inclusion was defined as an "MnS single inclusion".

(b) If the total of a content of Mn and a content of S in percent by mass in an inclusion was 15.0 to less than 80.0%, the inclusion was defined as an "MnS composite inclusions".

(c) If the total of a content of Al, a content of Ca, and a content of O in percent by mass was 80.0% or more and the total of a content of Mn and a content of S in percent by mass was less than 15.0% in an inclusion, the inclusion was defined as a "single oxide".

(d) If the total of a content of Al, a content of Ca, and a content of O in percent by mass was 15.0 to less than 80.0% and the total of a content of Mn and a content of S in percent by mass was 15.0 to less than 80.0% in an inclusion, the inclusion was defined as an "MnS composite oxide".

The inclusions taken as the object of the above-described identification were inclusions having an equivalent circular diameter of 1.0 μm or more. The beam diameter in the EDX used to identify the inclusions was set to about 50 nm.

[Determination of Surface Number Density SN]

Among the inclusions identified in the 50 visual fields, the total number of MnS single inclusions having an equivalent circular diameter of 5.0 μm or more and MnS composite inclusions having an equivalent circular diameter of 5.0 μm or more was determined. The surface number density SN (/mm$^2$) was determined based on the total number of MnS single inclusions having an equivalent circular diameter of 5.0 μm or more and MnS composite inclusions having an equivalent circular diameter of 5.0 μm or more, and the total area of the 50 visual fields.

[Determination of MnS-Based Inclusions Number Ratio $RA_{MnS}$]

Among the inclusions identified in the 50 visual fields, the total number of inclusions having an equivalent circular diameter of 1.0 μm or more was determined. In addition, among the inclusions identified in the 50 visual fields, the total number of MnS single inclusions having an equivalent circular diameter of 1.0 μm or more and MnS composite inclusions having an equivalent circular diameter of 1.0 μm or more was determined. Based on the total number of inclusions having an equivalent circular diameter of 1.0 μm or more, and the total number of MnS single inclusions having an equivalent circular diameter of 1.0 μm or more and MnS composite inclusions having an equivalent circular diameter of 1.0 μm or more, the MnS-based inclusions number ratio $RA_{MnS}$ (%) was determined by the following formula.

$$RA_{MnS}=(\text{total number of } MnS \text{ single inclusions having an equivalent circular diameter of 1.0 μm or more and } MnS \text{ composite inclusions having an equivalent circular diameter of 1.0 μm or more})/(\text{total number of inclusions having an equivalent circular diameter of 1.0 μm or more})\times 100$$

[Determination of MnS Composite Oxides Number Ratio $RA_{OX}$]

Among the inclusions identified in the 50 visual fields, the total number of oxides having an equivalent circular diameter of 1.0 μm or more (single oxides and MnS composite oxides) was determined. In addition, among the inclusions identified in the 50 visual fields, the total number of MnS composite oxides having an equivalent circular diameter of 1.0 μm or more was determined. Based on the total number of oxides having an equivalent circular diameter of 1.0 μm or more and the total number of MnS composite oxides having an equivalent circular diameter of 1.0 μm or more, the MnS composite oxides number ratio $RA_{OX}$ (%) was determined by the following formula.

$$RA_{OX}=(\text{total number of MnS composite oxides having an equivalent circular diameter of 1.0 } \mu m \text{ or more})/(\text{total number of oxides having an equivalent circular diameter of 1.0 } \mu m \text{ or more})\times 100$$

[Bending Fatigue Test]

The steel material of each test number (steel bar having a diameter of 80 mm) was subjected to hot cogging assuming a hot forging process in a process for producing a crankshaft. Specifically, the steel material was heated at 1200° C. The heated steel material was subjected to hot cogging, and allowed to cool to normal temperature in the atmosphere to produce a cogged material having a diameter of 50 mm. The finishing temperature in the hot cogging was 1000 to 1050° C.

Figure 4:
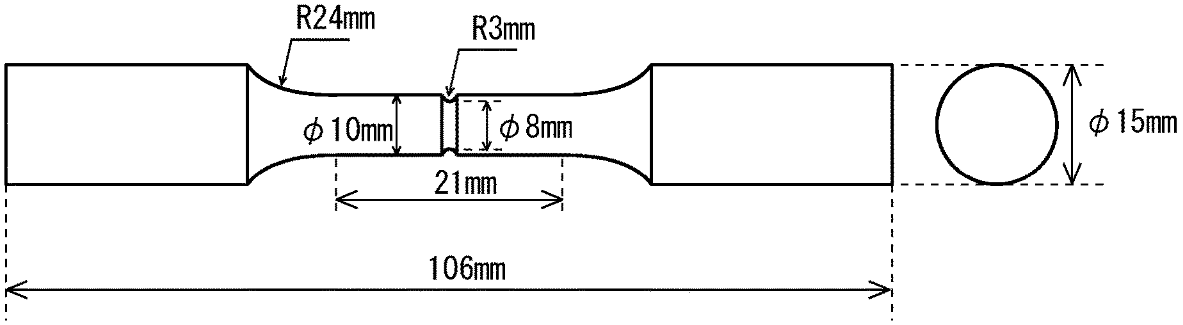
FIG. 4 is a side view of a bending fatigue test specimen for an Ono type rotating bending fatigue test in the Examples.

An Ono type rotating bending fatigue test specimen (hereunder, referred to as "fatigue test specimen") illustrated in FIG. 4 was taken from the R/2 position of the cogged material. The longitudinal direction of the fatigue test specimen was parallel to the longitudinal direction of the cogged material. The central axis of the fatigue test specimen approximately coincided with the R/2 position. In FIG. 4, numerical values given in "mm" indicate dimensions (in units of mm). In FIG. 4, "φ" indicates diameter, and "R" indicates radius of curvature.

The prepared fatigue test specimen was subjected to a nitrocarburizing treatment assuming nitriding in a process for producing a crankshaft. The treatment temperature in the nitrocarburizing treatment was set in the range of 580 to 600° C., and the holding time at the treatment temperature was set in the range of 1.5 to 2.0 hours. A well-known atmospheric gas ($NH_3$+RX gas) was used as the atmospheric gas during the nitrocarburizing treatment. After the holding time elapsed, the fatigue test specimen was cooled with water to prepare a fatigue test specimen simulating a crankshaft.

An Ono type rotating bending fatigue test was performed using the prepared fatigue test specimen. Specifically, in the atmosphere at normal temperature, the rotation speed was set to 3000 rpm (50 Hz), and the test cutoff was set at $1\times10^7$ cycles. The stress amplitude was set to three conditions, namely, 600 MPa, 630 MPa, and 660 MPa, and tests were performed under these three conditions, respectively, and a number of tests N under each stress amplitude was N=2. The bending fatigue strength was evaluated as follows based on the obtained results.

- Evaluation A: did not rupture in the two tests at a stress amplitude of 660 MPa (durable)
- Evaluation B: did not rupture in the two tests at a stress amplitude of 630 MPa (durable), but ruptured in one or more of the tests at a stress amplitude of 660 MPa
- Evaluation C: did not rupture in the two tests at a stress amplitude of 600 MPa (durable), but ruptured in one or more of the tests at a stress amplitude of 630 MPa
- Evaluation D: ruptured in one or more of the tests at a stress amplitude of 600 MPa In the case of evaluations A to C, it was determined that the fatigue test specimen was excellent in rotating bending fatigue strength, while in the case of evaluation D, it was determined that the rotating bending fatigue strength was low.

[Bend-Straightening Property Evaluation Test]

The steel material of each test number (steel bar having a diameter of 80 mm) was subjected to hot cogging assuming a hot forging process in a process for producing a crankshaft. Specifically, the steel material was heated at 1200° C. The heated steel material was subjected to hot cogging, and allowed to cool to normal temperature in the atmosphere to produce a cogged material having a diameter of 50 mm. The finishing temperature in the hot cogging was 1000 to 1050° C.

Figure 5:
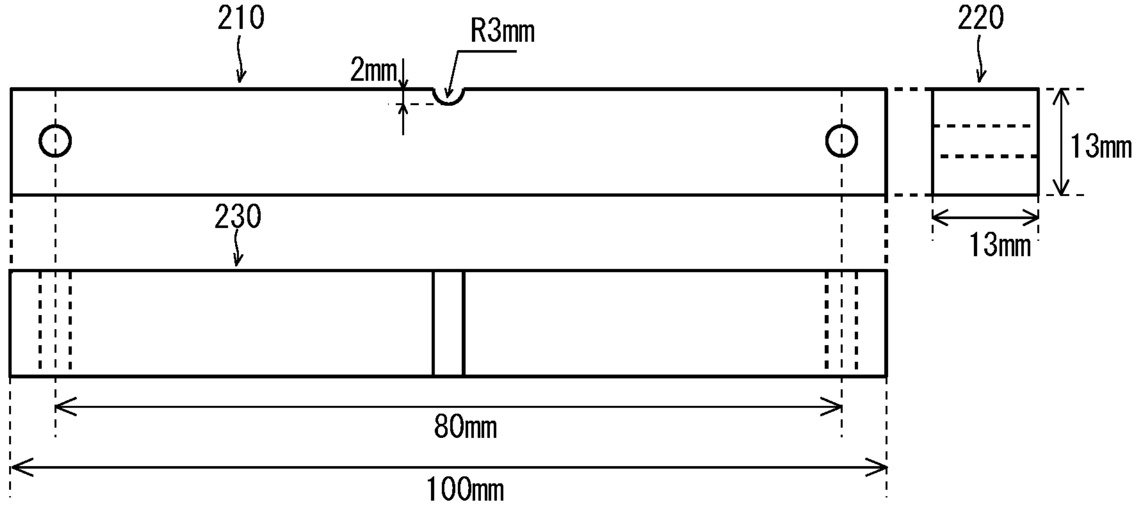
FIG. 5 is a multiple view drawing including a front view, a side view, and a plan view of a bending test specimen for a four-point bending test in the Examples.

A four-point bending test specimen illustrated in FIG. 5 was taken from the R/2 position of the cogged material. In FIG. 5, a front view 210, a side view 220, and a plan view 230 of the four-point bending test specimen are shown. Numerical values given in "mm" in the figure indicate dimensions. A dimension preceded by "R" in the figure indicates the radius of curvature. A semicircular notch portion (the radius of curvature of the notch bottom is 3 mm, and the depth is 2 mm) extending in a direction perpendicular to the longitudinal direction was provided at a central position in the longitudinal direction of the four-point bending test specimen.

The prepared four-point bending test specimen was subjected to a nitrocarburizing treatment assuming nitriding in a process for producing a crankshaft. The treatment temperature in the nitrocarburizing treatment was set in the range of 580 to 600° C., and the holding time at the treatment temperature was set in the range of 1.5 to 2.0 hours. A well-known atmospheric gas ($NH_3$+RX gas) was used as the atmospheric gas during the nitrocarburizing treatment. After the holding time elapsed, the fatigue test specimen was cooled with water to prepare a four-point bending test specimen simulating a crankshaft.

The prepared four-point bending test specimen was subjected to a bend-straightening test. First, a strain gauge with a gauge length of 2 mm was attached (adhered) to the notch bottom of the notch portion of the four-point bending test specimen. Thereafter, a four-point bending test was performed in which a tensile strain was applied to the notch bottom by a four-point bending method until the strain gauge was disconnected. In the four-point bending test, four-point bending was performed in which an inside inter-fulcrum distance was set to 30 mm and an outside inter-fulcrum distance was set to 80 mm. The strain rate during four-point bending was set to 2 mm/min. The maximum strain amount (με) at the time the strain gauge was disconnected was determined. The four-point bending test was conducted 10 times for each test number, and the average of the maximum strain amounts obtained in the 10 tests was adopted as the bend-straightening strain amount. The bend-straightening property was evaluated as follows based on the obtained bend-straightening strain amount.

Evaluation A: bend-straightening strain amount is 40000με or more.

Evaluation B: bend-straightening strain amount is 30000 to less than 40000με.

Evaluation C: bend-straightening strain amount is 20000 to less than 30000με.

Evaluation D: bend-straightening strain amount is less than 20000με.

In the case of evaluations A to C, it was determined that the four-point bending test specimen was excellent in a bend-straightening property, while in the case of evaluation D, it was determined that the four-point bending test specimen was poor in a bend-straightening property.

[Machinability Evaluation Test]

The steel material of each test number (steel bar having a diameter of 80 mm) was subjected to hot cogging assuming a hot forging process in a process for producing a crankshaft. Specifically, the steel material was heated at 1200° C. The heated steel material was subjected to hot cogging, and allowed to cool to normal temperature in the atmosphere to produce a cogged material having a diameter of 50 mm. The finishing temperature in the hot cogging was 1000 to 1050° C. The cogged material was cut in a direction perpendicular to the longitudinal direction, and a sample having a diameter of 50 mm and a length of 200 mm was taken.

Machinability was evaluated by drilling using a gun drill at the R/2 position on the surface (cut surface) perpendicular to the longitudinal direction of the sample. Specifically, at the R/2 position, drilling was performed parallel to the axial direction using a standard gun drill (manufactured by Tungaloy Corporation, with no breaker) having a diameter of 9.5 mm. The cutting speed during drilling was set to 107 mm/min (drill rotation speed was 3600 rpm), the feed rate was set to 0.023 mm/rev, and the piercing distance was set to 90 mm/hole. After drilling of 200 holes was performed under the above conditions, the amount of wear of the flank of the gun drill was measured. The machinability was evaluated as follows according to the amount of wear that was measured.

Evaluation A: amount of wear was less than 30 μm

Evaluation B: amount of wear was 30 to less than 40 μm

Evaluation C: amount of wear was 40 to less than 50 μm

Evaluation D: amount of wear was 50 μm or more

In the case of evaluations A to C, it was determined that the cogged material was excellent in machinability, while in the case of evaluation D, it was determined that the cogged material was poor in machinability.

[Wear Resistance Evaluation Test]

A block material with dimensions of 10 mm×15 mm×6.35 mm was taken from the R/2 position of the cogged material having a diameter of 50 mm that was prepared in the machinability evaluation test. A test surface with dimensions of 15 mm×6.35 mm was made parallel to the central axis of the cogged material.

The block material was subjected to a nitrocarburizing treatment assuming nitriding in a process for producing a crankshaft. The treatment temperature in the nitrocarburizing treatment was set in the range of 580 to 600° C., and the holding time at the treatment temperature was set in the range of 1.5 to 2.0 hours. A well-known atmospheric gas ($NH_3$+RX gas) was used as the atmospheric gas during the nitrocarburizing treatment. After the holding time elapsed, the block material was cooled with water to prepare a block test specimen simulating a crankshaft.

The test surface (10 mm×6.35 mm) of the block test specimen was subjected to lapping to make the arithmetic average roughness Ra of the test surface 0.2. Here, the arithmetic average roughness Ra was measured according to JIS B 0601 (2013), with a reference length of 5 mm.

Figure 6:
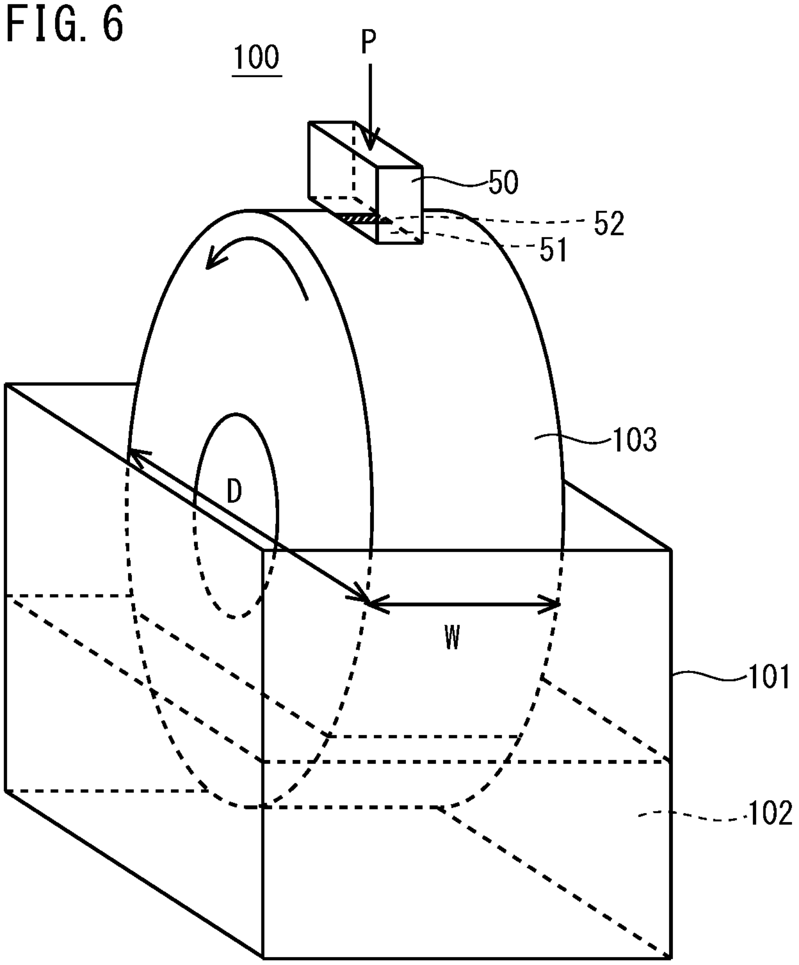
FIG. 6 is a perspective view illustrating a block-on-ring wearing testing machine in the Examples.

A block-on-ring wear test illustrated in FIG. 6 was performed using the sample material. Referring to FIG. 6, a block-on-ring wear testing machine 100 included a bath 101 containing a lubricating oil 102, and a ring test specimen 103. A commercially available engine oil with a viscosity of 0W-20 was used as the lubricating oil 102. An Al alloy which is a common bearing metal material was adopted as the starting material of the ring test specimen 103. The Al alloy contained Sn and Si in amounts of 12% and 3% by mass, respectively, with the balance being Al. An outer diameter D of the ring test specimen 103 was 35 mm, and a width W of the ring test specimen 103 was 8.7 mm.

As illustrated in FIG. 6, the lower part of the ring test specimen 103 was immersed in the lubricating oil 102 in the bath 101. Further, a block test specimen 50 was arranged above the ring test specimen 103. At such time, the block test specimen 50 was arranged so that a test surface 51 of the block test specimen 50 faced the ring test specimen 103. A wearing test was performed by rotating the ring test specimen 103 while pressing the block test specimen 50 against the outer peripheral surface of the ring test specimen 103 with a load P of 100 N in a direction from the upper part toward the lower part of the block test specimen 50. At such time, the rotational speed of the ring test specimen 103 was set to 700 rpm, and the sliding speed was set to 1.28 m/sec. The test was interrupted every 60 minutes from the time that the test started, and on the test surface 51 of the block test specimen 50, the lubricating oil on a contact portion 52 in contact with the outer peripheral surface of the ring test specimen 103 was wiped off, and thereafter the test was resumed. This action was repeated and the test was continued until the total sliding time (test time) reached 100 hours. When the sliding time (test time) passed 100 hours, the test was ended.

An arbitrary five visual fields (each visual field was 250 μm×150 μm) on the contact portion 52 of the test surface 51 of the block test specimen 50 after the test ended were observed at a magnification of ×1000 using an SEM, and whether or not peeling of the compound layer had occurred as well as whether or not fine cracks were present in the compound layer were investigated. The wear resistance was evaluated as follows based on the investigation results.

Evaluation A: no peeling, and no fine cracks

Evaluation B: no peeling, but fine cracks were present

Evaluation D: peeling had occurred

In the case of evaluations A and B, it was determined that the block test specimen was excellent in wear resistance, while in the case of evaluation D it was determined that the block test specimen was poor in wear resistance.

[Test Result]

The test results are shown in Table 4 and Table 5.

TABLE 4

| Test No. | Surface Number Density SN (/mm$^2$) | Number Ratio $RA_{MnS}$ (%) | Number Ratio $RA_{OX}$ (%) | Rotating Bending Fatigue Strength | Bend-straightening Property | Machinability | Wear Resistance |
|---|---|---|---|---|---|---|---|
| 1 | 52 | 88 | 51 | A | A | A | A |
| 2 | 65 | 84 | 38 | A | B | A | A |
| 3 | 53 | 88 | 44 | B | A | A | A |
| 4 | 47 | 81 | 36 | A | A | A | A |
| 5 | 55 | 78 | 48 | A | A | A | A |
| 6 | 70 | 75 | 35 | A | B | A | A |
| 7 | 68 | 76 | 52 | B | A | A | A |
| 8 | 69 | 82 | 78 | A | A | A | A |
| 9 | 55 | 90 | 53 | A | A | A | A |
| 10 | 63 | 78 | 64 | A | B | A | A |
| 11 | 70 | 90 | 37 | B | A | A | A |
| 12 | 50 | 76 | 44 | A | A | A | A |
| 13 | 94 | 89 | 49 | A | A | A | A |
| 14 | 30 | 79 | 74 | A | A | B | A |
| 15 | 34 | 87 | 57 | A | A | A | A |
| 16 | 38 | 76 | 60 | A | A | A | A |
| 17 | 61 | 79 | 74 | A | C | A | A |
| 18 | 70 | 90 | 42 | A | B | A | A |
| 19 | 61 | 86 | 63 | A | A | A | A |
| 20 | 68 | 79 | 51 | A | A | A | A |

TABLE 4-continued

| Test No. | Surface Number Density SN (/mm$^2$) | Number Ratio $RA_{MnS}$ (%) | Number Ratio $RA_{OX}$ (%) | Rotating Bending Fatigue Strength | Bend-straightening Property | Machinability | Wear Resistance |
|---|---|---|---|---|---|---|---|
| 21 | 62 | 75 | 79 | A | A | A | A |
| 22 | 44 | 89 | 48 | A | C | A | A |
| 23 | 70 | 77 | 39 | A | B | A | A |
| 24 | 44 | 77 | 37 | B | A | A | A |
| 25 | 60 | 75 | 45 | A | A | A | A |
| 26 | 59 | 87 | 63 | A | A | A | A |
| 27 | 60 | 88 | 76 | A | A | A | A |
| 28 | 60 | 85 | 46 | A | C | A | A |
| 29 | 46 | 87 | 48 | A | A | A | A |
| 30 | 67 | 84 | 60 | A | B | A | A |
| 31 | 43 | 80 | 79 | A | A | A | A |
| 32 | 65 | 78 | 65 | A | A | A | A |
| 33 | 63 | 81 | 36 | C | A | A | A |
| 34 | 48 | 80 | 77 | B | A | A | A |
| 35 | 45 | 78 | 70 | A | A | A | A |
| 36 | 52 | 84 | 61 | A | C | A | A |
| 37 | 62 | 83 | 65 | A | B | A | A |
| 38 | 54 | 84 | 50 | A | A | A | A |
| 39 | 51 | 82 | 46 | C | A | A | A |
| 40 | 49 | 81 | 52 | B | A | A | A |
| 41 | 57 | 83 | 49 | A | A | A | A |
| 42 | 52 | 76 | 41 | A | C | A | A |
| 43 | 53 | 78 | 75 | C | A | A | A |
| 44 | 56 | 76 | 62 | A | B | A | A |
| 45 | 54 | 82 | 75 | B | A | A | A |
| 46 | 62 | 85 | 71 | A | B | C | A |
| 47 | 74 | 79 | 53 | C | A | A | A |
| 48 | 69 | 76 | 49 | A | A | B | A |
| 49 | 71 | 86 | 35 | B | A | A | A |
| 50 | 71 | 89 | 71 | A | A | A | A |
| 51 | 66 | 79 | 64 | A | A | A | A |
| 52 | 64 | 75 | 59 | A | A | A | A |
| 53 | 51 | 79 | 46 | A | A | A | A |
| 54 | 59 | 79 | 79 | A | A | A | A |
| 55 | 42 | 75 | 35 | A | A | A | A |
| 56 | 68 | 80 | 43 | A | A | A | A |
| 57 | 64 | 77 | 42 | A | A | A | A |
| 58 | 66 | 78 | 45 | A | A | A | A |
| 59 | 56 | 78 | 49 | A | A | A | A |
| 60 | 59 | 75 | 60 | A | A | A | A |
| 61 | 48 | 76 | 39 | A | A | A | A |
| 62 | 61 | 71 | 39 | A | A | A | A |
| 63 | 55 | 75 | 49 | A | A | A | A |

TABLE 5

| Test No. | Surface Number Density SN (/mm$^2$) | Number Ratio $RA_{MnS}$ (%) | Number Ratio $RA_{OX}$ (%) | Rotating Bending Fatigue Strength | Bend-straightening Property | Machinability | Wear Resistance |
|---|---|---|---|---|---|---|---|
| 64 | 70 | 86 | 50 | A | D | A | A |
| 65 | 61 | 71 | 37 | D | A | A | A |
| 66 | 81 | 76 | 65 | A | D | A | A |
| 67 | 48 | 80 | 44 | D | A | A | A |
| 68 | 43 | 86 | 39 | A | D | A | A |
| 69 | 39 | 79 | 40 | D | A | A | A |
| 70 | 70 | 84 | 37 | D | A | A | A |
| 71 | 27 | 84 | 51 | A | A | D | A |
| 72 | 41 | 83 | 63 | A | D | A | A |
| 73 | 39 | 79 | 60 | D | A | A | A |
| 74 | 72 | 83 | 56 | A | D | A | A |
| 75 | 59 | 77 | 65 | D | A | A | A |
| 76 | 51 | 77 | 36 | D | B | A | D |
| 77 | 55 | 81 | 45 | A | D | A | A |
| 78 | 52 | 90 | 50 | D | A | A | A |
| 79 | 38 | 83 | 41 | A | C | D | A |
| 80 | 90 | 85 | 46 | D | A | A | A |
| 81 | 18 | 86 | 46 | A | A | D | A |
| 82 | 61 | 67 | 44 | A | A | A | D |
| 83 | 68 | 75 | 28 | A | A | A | D |

Referring to Table 4 and Table 5, in Test Nos. 1 to 63 the content of each element in the chemical composition was appropriate, Fn1 was 1.00 to 2.05, and Fn2 was 0.42 to 0.60. In addition, the production conditions were appropriate. Therefore, the surface number density SN was 20/$mm^2$ or more, the MnS-based inclusions number ratio $RA_{MnS}$ was 70% or more, and the MnS composite oxides number ratio $RA_{OX}$ was 30% or more. Therefore, excellent rotating bending fatigue strength was obtained, an excellent bend-straightening property was obtained, excellent machinability was obtained, and excellent wear resistance was obtained.

On the other hand, in Test No. 64, the content of C was too high. Consequently, the bend-straightening strain amount was less than 20000με, and thus the bend-straightening property was low.

In Test No. 65, the content of C was too low. Consequently, in the Ono type rotating bending fatigue test, the fatigue test specimen ruptured before reaching $1\times10^7$ cycles at a stress amplitude of 600 MPa, and thus the bending fatigue strength was low.

In Test No. 66, the content of Si was too high. Consequently, the bend-straightening strain amount was less than 20000με, and thus the bend-straightening property was low.

In Test No. 67, the content of Si was too low. Consequently, in the Ono type rotating bending fatigue test, the fatigue test specimen ruptured before reaching $1\times10^7$ cycles at a stress amplitude of 600 MPa, and thus the bending fatigue strength was low.

In Test No. 68, the content of Mn was too high. Consequently, the bend-straightening strain amount was less than 20000με, and thus the bend-straightening property was low.

In Test No. 69, the content of Mn was too low. Consequently, in the Ono type rotating bending fatigue test, the fatigue test specimen ruptured before reaching $1\times10^7$ cycles at a stress amplitude of 600 MPa, and thus the bending fatigue strength was low.

In Test No. 70, the content of P was too high. Consequently, in the Ono type rotating bending fatigue test, the fatigue test specimen ruptured before reaching $1\times10^7$ cycles at a stress amplitude of 600 MPa, and thus the bending fatigue strength was low.

In Test No. 71, the content of S was too low. Consequently, the amount of wear of the flank of the gun drill in the machinability evaluation test was 50 μm or more, and thus the machinability was low.

In Test No. 72, the content of Cr was too high. Consequently, the bend-straightening strain amount was less than 20000με, and thus the bend-straightening property was low.

In Test No. 73, the content of Ti was too high. Consequently, in the Ono type rotating bending fatigue test, the fatigue test specimen ruptured before reaching $1\times10^7$ cycles at a stress amplitude of 600 MPa, and thus the bending fatigue strength was low.

In Test No. 74, the content of Al was too high. Consequently, the bend-straightening strain amount was less than 20000με, and thus the bend-straightening property was low.

In Test No. 75, the content of N was too low. Consequently, in the Ono type rotating bending fatigue test, the fatigue test specimen ruptured before reaching $1\times10^7$ cycles at a stress amplitude of 600 MPa, and thus the bending fatigue strength was low.

In Test No. 76, the content of O was too high. Consequently, in the Ono type rotating bending fatigue test, the fatigue test specimen ruptured before reaching $1\times10^7$ cycles at a stress amplitude of 600 MPa, and thus the bending fatigue strength was low. Further, peeling of the compound layer was observed on the test surface of the block test specimen after the block-on-ring wear test, and thus the wear resistance was low.

In Test No. 77, although the content of each element was within the range of the present embodiment, Fn1 defined by Formula (1) was more than the upper limit. Consequently, the bend-straightening strain amount was less than 20000με, and thus the bend-straightening property was low.

In Test No. 78, although the content of each element was within the range of the present embodiment, Fn1 defined by Formula (1) was less than the lower limit. Consequently, in the Ono type rotating bending fatigue test, the fatigue test specimen ruptured before reaching $1\times10^7$ cycles at a stress amplitude of 600 MPa, and thus the bending fatigue strength was low.

In Test No. 79, although the content of each element was within the range of the present embodiment, Fn2 defined by Formula (2) was more than the upper limit. Consequently, the amount of wear of the flank of the gun drill in the machinability evaluation test was 50 μm or more, and thus the machinability was low.

In Test No. 80, although the content of each element was within the range of the present embodiment, Fn2 defined by Formula (2) was less than the lower limit. Consequently, in the Ono type rotating bending fatigue test, the fatigue test specimen ruptured before reaching $1\times10^7$ cycles at a stress amplitude of 600 MPa, and thus the bending fatigue strength was low.

In Test No. 81, although the content of each element of the chemical composition was within the range of the present embodiment and Fn1 and Fn2 were also each within the range of the present embodiment, the amount of dissolved oxygen during refining in the LF was more than 40 ppm. Therefore, the surface number density SN was less than 20/$mm^2$. As a result, the amount of wear of the flank of the gun drill in the machinability evaluation test was 50 μm or more, and thus the machinability was low.

In Test No. 82, although the content of each element of the chemical composition was within the range of the present embodiment and Fn1 and Fn2 were also each within the range of the present embodiment, the casting speed in the continuous casting process was less than 0.6 m/min. Therefore, the MnS-based inclusions number ratio $RA_{MnS}$ was less than 70%. As a result, peeling of the compound layer was observed on the test surface of the block test specimen after the block-on-ring wear test, and thus the wear resistance was low.

In Test No. 83, although the content of each element of the chemical composition was within the range of the present embodiment and Fn1 and Fn2 were also each within the range of the present embodiment, the amount of dissolved oxygen in the molten steel five minutes before the end of the RH vacuum degassing treatment was less than 40 ppm. Therefore, the MnS composite oxides number ratio $RA_{OX}$ was less than 30%. As a result, peeling of the compound layer was observed on the test surface of the block test specimen after the block-on-ring wear test, and thus the wear resistance was low.

Second Example

[Production of Test Material]

Molten steels having the chemical compositions shown in Table 6 were melted in a 70-ton converter.

TABLE 6

| Test | Chemical Composition (in mass %; balance is Fe and impurities) | | | | | | | | | | | |
|---|---|---|---|---|---|---|---|---|---|---|---|---|
| No. | C | Si | Mn | P | S | Cr | Ti | Al | N | O | Fn1 | Fn2 |
| 84 | 0.30 | 0.15 | 1.01 | 0.015 | 0.055 | 0.05 | 0.015 | 0.010 | 0.014 | 0.0032 | 1.44 | 0.50 |
| 85 | 0.30 | 0.17 | 1.00 | 0.014 | 0.054 | 0.06 | 0.015 | 0.011 | 0.015 | 0.0029 | 1.51 | 0.50 |
| 86 | 0.31 | 0.16 | 1.02 | 0.015 | 0.055 | 0.05 | 0.014 | 0.010 | 0.015 | 0.0030 | 1.45 | 0.51 |
| 87 | 0.30 | 0.16 | 1.02 | 0.013 | 0.052 | 0.05 | 0.016 | 0.010 | 0.015 | 0.0033 | 1.45 | 0.50 |
| 88 | 0.31 | 0.16 | 0.99 | 0.014 | 0.056 | 0.05 | 0.016 | 0.011 | 0.014 | 0.0034 | 1.42 | 0.51 |
| 89 | 0.30 | 0.15 | 0.99 | 0.014 | 0.055 | 0.06 | 0.017 | 0.011 | 0.014 | 0.0035 | 1.50 | 0.50 |
| 90 | 0.31 | 0.14 | 1.01 | 0.015 | 0.055 | 0.04 | 0.015 | 0.009 | 0.014 | 0.0034 | 1.36 | 0.51 |
| 91 | 0.31 | 0.16 | 0.99 | 0.014 | 0.054 | 0.04 | 0.015 | 0.011 | 0.015 | 0.0029 | 1.35 | 0.50 |
| 92 | 0.30 | 0.17 | 1.00 | 0.013 | 0.052 | 0.05 | 0.014 | 0.010 | 0.017 | 0.0029 | 1.43 | 0.50 |
| 93 | 0.30 | 0.17 | 1.02 | 0.015 | 0.056 | 0.06 | 0.016 | 0.010 | 0.017 | 0.0033 | 1.52 | 0.51 |
| 94 | 0.31 | 0.16 | 1.02 | 0.015 | 0.054 | 0.06 | 0.016 | 0.011 | 0.016 | 0.0031 | 1.53 | 0.52 |
| 95 | 0.29 | 0.15 | 0.99 | 0.016 | 0.055 | 0.06 | 0.016 | 0.011 | 0.015 | 0.0031 | 1.50 | 0.49 |
| 96 | 0.29 | 0.14 | 0.98 | 0.016 | 0.056 | 0.04 | 0.014 | 0.010 | 0.015 | 0.0024 | 1.33 | 0.48 |
| 97 | 0.30 | 0.17 | 0.99 | 0.015 | 0.058 | 0.05 | 0.015 | 0.009 | 0.014 | 0.0033 | 1.41 | 0.50 |
| 98 | 0.31 | 0.14 | 1.01 | 0.017 | 0.056 | 0.05 | 0.015 | 0.009 | 0.014 | 0.0032 | 1.43 | 0.51 |

The molten steel was subjected to secondary refining. In the secondary refining, first, refining in an LF was performed. The oxygen content of the molten steel during refining in the LF is shown in the column "Dissolved Oxygen Amount (ppm)" in the column "LF" in Table 7, and the molten steel temperature during refining in the LF is shown in the column "Molten Steel Temperature (C)" in the column "LF" in Table 7.

TABLE 7

| | LF | | RH | | | Continuous | Surface | | | | |
|---|---|---|---|---|---|---|---|---|---|---|---|
| Test No. | Molten Steel Temperature (° C) | Dissolved Oxygen Amount (ppm) | Molten Steel Temperature (° C.) | Dissolved Oxygen Amount (ppm) | Al Deoxidation Time (mins) | Casting Casting Speed (m/min) | Number Density SN (/mm$^2$) | Number Ratio $RA_{MnS}$ (%) | Number Ratio $RA_{OX}$ (%) | Machin-ability | Wear Resist-ance |
| 84 | 1580-1610 | 10-40 | 1570-1600 | 40-70 | 3 | 0.7-0.9 | 44 | 88 | 51 | A | A |
| 85 | 1550-1580 | 10-40 | 1560-1590 | 40-70 | 3 | 0.7-0.9 | 21 | 82 | 48 | B | A |
| 86 | 1560-1590 | 10-40 | 1570-1600 | 40-70 | 3 | 0.7-0.9 | 25 | 84 | 49 | A | A |
| 87 | 1580-1610 | 10-40 | 1590-1620 | 90-120 | 4 | 0.6-0.8 | 42 | 70 | 44 | A | B |
| 88 | 1580-1610 | 10-40 | 1580-1610 | 60-90 | 4 | 0.6-0.8 | 38 | 76 | 46 | A | A |
| 89 | 1580-1610 | 10-40 | 1580-1610 | 40-70 | 5 | 0.8-1.0 | 37 | 85 | 30 | A | B |
| 90 | 1580-1610 | 10-40 | 1580-1610 | 40-70 | 5 | 0.7-0.9 | 45 | 86 | 35 | A | A |
| 91 | 1520-less than 1550 | 10-40 | 1570-1600 | 40-70 | 3 | 0.7-0.9 | 14 | 86 | 35 | D | A |
| 92 | 1580-1610 | More than 40-70 | 1570-1600 | 40-70 | 4 | 0.7-0.9 | 18 | 84 | 42 | D | A |
| 93 | 1550-1580 | 10-40 | 1520-less than 1550 | 40-70 | 3 | 0.7-0.9 | 12 | 84 | 45 | D | A |
| 94 | 1580-1610 | 10-40 | 1600-1630 | More than 120-150 | 5 | 0.7-0.9 | 17 | 54 | 35 | D | D |
| 95 | 1580-1610 | 10-40 | 1550-1570 | 10-less than 40 | 5 | 0.7-0.9 | 48 | 95 | 28 | A | D |
| 96 | 1580-1610 | 10-40 | 1570-1600 | 40-70 | 7 | 0.7-0.9 | 38 | 84 | 22 | A | D |
| 97 | 1580-1610 | 10-40 | 1570-1600 | 40-70 | 3 | More than 1.0-1.3 | 52 | 81 | 18 | A | D |
| 98 | 1580-1610 | 10-40 | 1570-1600 | 40-70 | 4 | 0.4-less than 0.6 | 48 | 68 | 45 | A | D |

After the refining in the LF, a RH vacuum degassing treatment was performed. The molten steel temperature during the RH vacuum degassing treatment is shown in the column "Molten Steel Temperature (° C.)" in the column "RH" in Table 7. The amount of dissolved oxygen in the molten steel five minutes before the end of the RH vacuum degassing treatment is shown in the column "Dissolved Oxygen Amount (ppm)" in the column "RH" in Table 7. The treatment time of deoxidation treatment by addition of Al before the end of the RH vacuum degassing treatment is shown in the column "Al Deoxidation Time (mins)" in the column "RH" in Table 7. In the column "Molten Steel Temperature (° C.)" in the column "LF", "X1-X2" means that the molten steel temperature during refining in the LF fluctuated within the range of X1 to X2° C. In the column "Dissolved Oxygen Amount (ppm)" in the column "LF", "X3-X4" means that the oxygen content of the molten steel during refining in the LF fluctuated within the range of X3 to X4 ppm. In the column "Molten Steel Temperature (° C.)" in the column "RH", "X5-X6" means that the molten steel temperature during the RH vacuum degassing treatment fluctuated within the range of X5 to X6° C. In the column "Dissolved Oxygen Amount (ppm)" in the column "RH", "X7-X8" means that the amount of dissolved oxygen in the molten steel five minutes before the end of the RH vacuum degassing treatment fluctuated within the range of X7 to X8 ppm. In the column "Al Deoxidation Time (mins)" in the column "RH", "X9" means that the treatment time of the deoxidation treatment by addition of Al before the end of the RH vacuum degassing treatment was X9 minutes.

The molten steel after the secondary refining was used to produce a bloom by a continuous casting method. The casting speed from the start until the end of the continuous casting is shown in the column "Casting Speed (m/min)" in the column "Continuous Casting" in Table 7. In the column "Casting Speed (m/min)" in the column "Continuous Casting", "X10-X11" means that the casting speed from the start until the end of the continuous casting fluctuated within the range of X10 to X11 m/min.

The produced bloom was subjected to a rough rolling process to produce a billet having a rectangular shape in which a cross section perpendicular to the longitudinal direction was 180 mm×180 mm. For each test number, the heating temperature in the rough rolling process was in the range of 1200 to 1260° C.

A finish rolling was performed using the produced billet, and then cooling was allowed in the atmosphere to thereby produce a steel material that was a steel bar having a diameter of 80 mm. The steel material of each test number was subjected to the following evaluation tests.

[Evaluation Tests]

[Inclusions Measurement Test]

The surface number density SN, the MnS-based inclusions number ratio $RA_{MnS}$, and the MnS composite oxides number ratio $RA_{OX}$ of the steel material of each test number were determined by the same methods as the methods used in the First Example.

[Machinability Evaluation Test]

For each test number, a machinability evaluation test was performed by the same method as the method used in the First Example, and machinability was evaluated using the same criteria as in the First Example.

[Wear Resistance Evaluation Test]

For each test number, a wear resistance evaluation test was performed by the same method as the method used in the First Example, and wear resistance was evaluated using the same criteria as the criteria used in the wear resistance evaluation test in the First Example.

[Test Results]

The test results are shown in Table 7. Referring to Table 7, in Test Nos. 84 to 90 the content of each element in the chemical composition was appropriate, Fn1 was 1.00 to 2.05, and Fn2 was 0.42 to 0.60. In addition, the production conditions were appropriate. Therefore, the surface number density SN was 20/mm$^2$ or more, the MnS-based inclusions number ratio $RA_{MnS}$ was 70.0% or more, and the MnS composite oxides number ratio $RA_{OX}$ was 30.0% or more. Therefore, excellent rotating bending fatigue strength was obtained, an excellent bend-straightening property was obtained, excellent machinability was obtained, and excellent wear resistance was obtained.

On the other hand, in Test No. 91, although the content of each element of the chemical composition was within the range of the present embodiment and Fn1 and Fn2 were also each within the range of the present embodiment, the molten steel temperature during refining in the LF was less than 1550° C. Therefore, the surface number density SN was less than 20/mm$^2$. As a result, the amount of wear of the flank of the gun drill in the machinability evaluation test was 50 μm or more, and thus the machinability was low.

In Test No. 92, although the content of each element of the chemical composition was within the range of the present embodiment and Fn1 and Fn2 were also each within the range of the present embodiment, the amount of dissolved oxygen during refining in the LF was more than 40 ppm. Therefore, the surface number density SN was less than 20/mm$^2$. As a result, the amount of wear of the flank of the gun drill in the machinability evaluation test was 50 μm or more, and thus the machinability was low.

On the other hand, in Test No. 93, although the content of each element of the chemical composition was within the range of the present embodiment and Fn1 and Fn2 were also each within the range of the present embodiment, the molten steel temperature in the RH vacuum degassing treatment was less than 1550° C. Therefore, the surface number density SN was less than 20/mm$^2$. As a result, the amount of wear of the flank of the gun drill in the machinability evaluation test was 50 μm or more, and thus the machinability was low.

In Test No. 94, although the content of each element of the chemical composition was within the range of the present embodiment and Fn1 and Fn2 were also each within the range of the present embodiment, the amount of dissolved oxygen in the molten steel five minutes before the end of the RH vacuum degassing treatment was more than 120 ppm. Therefore, the surface number density SN was less than 20/mm$^2$. In addition, the MnS-based inclusions number ratio $RA_{MnS}$ was less than 70%. As a result, peeling of the compound layer was observed on the test surface of the block test specimen after the block-on-ring wear test, and thus the wear resistance was low. In addition, the amount of wear of the flank of the gun drill in the machinability evaluation test was 50 μm or more, and thus the machinability was low.

In Test No. 95, although the content of each element of the chemical composition was within the range of the present embodiment and Fn1 and Fn2 were also each within the range of the present embodiment, the amount of dissolved oxygen in the molten steel five minutes before the end of the RH vacuum degassing treatment was less than 40 ppm. Therefore, the MnS composite oxides number ratio $RA_{OX}$ was less than 30%. As a result, peeling of the compound layer was observed on the test surface of the block test specimen after the block-on-ring wear test, and thus the wear resistance was low.

In Test No. 96, although the content of each element of the chemical composition was within the range of the present embodiment and Fn1 and Fn2 were also each within the range of the present embodiment, the treatment time of the deoxidation treatment by addition of Al before the end of the RH vacuum degassing treatment was more than five minutes. Therefore, the MnS composite oxides number ratio $RA_{OX}$ was less than 30%. As a result, peeling of the compound layer was observed on the test surface of the block test specimen after the block-on-ring wear test, and thus the wear resistance was low.

In Test No. 97, although the content of each element of the chemical composition was within the range of the present embodiment and Fn1 and Fn2 were also each within the range of the present embodiment, the casting speed in the continuous casting process was more than 1.0 m/min. Therefore, the MnS composite oxides number ratio $RA_{OX}$ was less than 30%. As a result, peeling of the compound layer was observed on the test surface of the block test specimen after the block-on-ring wear test, and thus the wear resistance was low.

In Test No. 98, although the content of each element of the chemical composition was within the range of the present embodiment and Fn1 and Fn2 were also each within the range of the present embodiment, the casting speed in the continuous casting process was less than 0.6 m/min. Therefore, the MnS-based inclusions number ratio $RA_{MnS}$ was less than 70%. As a result, peeling of the compound layer was observed on the test surface of the block test specimen after the block-on-ring wear test, and thus the wear resistance was low.

An embodiment of the present invention has been described above. However, the foregoing embodiment is merely an example for implementing the present invention. Accordingly, the present invention is not limited to the above embodiment, and the above embodiment can be appropriately modified within a range that does not deviate from the gist of the present invention.

REFERENCE SIGNS LIST

1 Steel Material
10 Crankshaft
11 Pin Section
12 Journal Section
13 Arm Section
20 Nitrided Layer
23 Core Portion

The invention claimed is:

1. A steel material consisting of, in mass %,
C: 0.25% to 0.35%,
Si: 0.05 to 0.35%,
Mn: 0.85 to 1.20%,
P: 0.080% or less,
S: 0.030 to 0.100%,
Cr: 0.10% or less,
Ti: 0.050% or less,
Al: 0.050% or less,
N: 0.005 to 0.024%,
O: 0.0100% or less, and optionally one or more elements selected from a group consisting of:
Cu: 0.20% or less,
Ni: 0.20% or less,
Mo: 0.10% or less,
Nb: 0.050% or less,
Ca: 0.0100% or less,
Bi: 0.30% or less,
Te: 0.0100% or less,
Zr: 0.0100% or less, and
Pb: 0.09% or less, with
the balance being Fe and impurities,
wherein:
Fn1 defined by Formula (1) is 1.00 to 2.05,
Fn2 defined by Formula (2) is 0.42 to 0.60, and
when, among inclusions in the steel material,
an inclusion in which a total of a content of Mn and a content of S in percent by mass is 80.0% or more is defined as an MnS single inclusion,
an inclusion in which a total of a content of Mn and a content of S in percent by mass is 15.0 to less than 80.0% is defined as an MnS composite inclusion,
an inclusion in which a total of a content of Al, a content of Ca, and a content of O in percent by mass is 80.0% or more, and a total of a content of Mn and a content of S in percent by mass is less than 15.0% is defined as a single oxide, and
an inclusion in which a total of a content of Al, a content of Ca, and a content of O in percent by mass is 15.0 to less than 80.0%, and a total of a content of Mn and a content of S in percent by mass is 15.0 to less than 80.0% is defined as an MnS composite oxide,
in the steel material:
a surface number density of a total of the MnS single inclusions having an equivalent circular diameter of 5.0 μm or more and the MnS composite inclusions having an equivalent circular diameter of 5.0 μm or more is 20/mm$^2$ or more,
a ratio of a total number of the MnS single inclusions having an equivalent circular diameter of 1.0 μm or more and the MnS composite inclusions having an equivalent circular diameter of 1.0 μm or more with respect to a total number of inclusions having an equivalent circular diameter of 1.0 μm or more is 70% or more, and
a ratio of a number of the MnS composite oxides having an equivalent circular diameter of 1.0 μm or more with respect to a total number of the single oxides having an equivalent circular diameter of 1.0 μm or more and the MnS composite oxides having an equivalent circular diameter of 1.0 μm or more is 30% or more;

$$Fn1 = \mathrm{Mn} + 7.24\mathrm{Cr} + 6.53\mathrm{Al} \quad (1)$$

$$Fn2 = \mathrm{C} + 0.10\mathrm{Si} + 0.19\mathrm{Mn} + 0.23\mathrm{Cr} - 0.34\mathrm{S} \quad (2)$$

where, a content in percent by mass of a corresponding element is substituted for each symbol of an element in Formula (1) and Formula (2).

2. The steel material according to claim 1, containing, in lieu of a part of the Fe, one or more elements selected from a group consisting of:
Cu: 0.20% or less,
Ni: 0.20% or less,
Mo: 0.10% or less,
Nb: 0.050% or less,
Ca: 0.0100% or less,
Bi: 0.30% or less,
Te: 0.0100% or less,
Zr: 0.0100% or less, and
Pb: 0.09% or less.

3. A crankshaft, comprising:
a pin section,
a journal section, and
an arm section arranged between the pin section and the journal section,
at least the pin section and the journal section comprising:
a nitrided layer that is formed at an outer layer, and
a core portion that is further inward than the nitrided layer;
wherein:
the core portion consists of, in mass %,
C: 0.25% to 0.35%,
Si: 0.05 to 0.35%,
Mn: 0.85 to 1.20%,
P: 0.080% or less,
S: 0.030 to 0.100%,
Cr: 0.10% or less,
Ti: 0.050% or less,
Al: 0.050% or less,
N: 0.005 to 0.024%,
O: 0.0100% or less, and optionally one or more elements selected from a group consisting of:
Cu: 0.20% or less, Ni: 0.20% or less,
Mo: 0.10% or less,
Nb: 0.050% or less,
Ca: 0.0100% or less,
Bi: 0.30% or less,
Te: 0.0100% or less,
Zr: 0.0100% or less, and
Pb: 0.09% or less, with
the balance being Fe and impurities;
and wherein:
Fn1 defined by Formula (1) is 1.00 to 2.05,
Fn2 defined by Formula (2) is 0.42 to 0.60, and
when, among inclusions in the core portion,
an inclusion in which a total of a content of Mn and a content of S in percent by mass is 80.0% or more is defined as an MnS single inclusion,
an inclusion in which a total of a content of Mn and a content of S in percent by mass is 15.0 to less than 80.0% is defined as an MnS composite inclusion,
an inclusion in which a total of a content of Al, a content of Ca, and a content of O in percent by mass is 80.0% or more, and a total of a content of Mn and a content of S in percent by mass is less than 15.0% is defined as a single oxide, and
an inclusion in which a total of a content of Al, a content of Ca, and a content of O in percent by mass is 15.0 to less than 80.0%, and a total of a content of Mn and a content of S in percent by mass is 15.0 to less than 80.0% is defined as an MnS composite oxide,
in the core portion:
a surface number density of a total of the MnS single inclusions having an equivalent circular diameter of 5.0 μm or more and the MnS composite inclusions having an equivalent circular diameter of 5.0 μm or more is 20/mm$^2$ or more,
a ratio of a total number of the MnS single inclusions having an equivalent circular diameter of 1.0 μm or more and the MnS composite inclusions having an equivalent circular diameter of 1.0 μm or more with respect to a total number of inclusions having an equivalent circular diameter of 1.0 μm or more is 70% or more, and
a ratio of a number of the MnS composite oxides having an equivalent circular diameter of 1.0 μm or more with respect to a total number of the single oxides having an equivalent circular diameter of 1.0 μm or more and the MnS composite oxides having an equivalent circular diameter of 1.0 μm or more is 30% or more;

$$Fn1 = \mathrm{Mn} + 7.24\mathrm{Cr} + 6.53\mathrm{Al} \quad (1)$$

$$Fn2 = \mathrm{C} + 0.10\mathrm{Si} + 0.19\mathrm{Mn} + 0.23\mathrm{Cr} - 0.34\mathrm{S} \quad (2)$$

where, a content in percent by mass of a corresponding element is substituted for each symbol of an element in Formula (1) and Formula (2).

4. The crankshaft according to claim 3, wherein
the core portion further contains, in lieu of a part of the Fe, one or more elements selected from a group consisting of:
Cu: 0.20% or less,
Ni: 0.20% or less,
Mo: 0.10% or less,
Nb: 0.050% or less,
Ca: 0.0100% or less,
Bi: 0.30% or less,
Te: 0.0100% or less,
Zr: 0.0100% or less, and
Pb: 0.09% or less.

* * * * *